(12) United States Patent
Akagi et al.

(10) Patent No.: US 11,428,647 B2
(45) Date of Patent: Aug. 30, 2022

(54) TUBULAR BODY INNER SURFACE INSPECTION APPARATUS AND TUBULAR BODY INNER SURFACE INSPECTION METHOD

(71) Applicant: NIPPON STEEL CORPORATION, Tokyo (JP)

(72) Inventors: Toshio Akagi, Tokyo (JP); Hironao Yamaji, Tokyo (JP); Takeo Nakata, Tokyo (JP); Masaki Yamano, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 54 days.

(21) Appl. No.: 16/976,410

(22) PCT Filed: Jul. 30, 2018

(86) PCT No.: PCT/JP2018/028396
§ 371 (c)(1),
(2) Date: Feb. 10, 2021

(87) PCT Pub. No.: WO2020/026290
PCT Pub. Date: Feb. 6, 2020

(65) Prior Publication Data
US 2021/0208085 A1 Jul. 8, 2021

(51) Int. Cl.
*G01N 21/954* (2006.01)
*G01N 21/88* (2006.01)

(52) U.S. Cl.
CPC ....... *G01N 21/954* (2013.01); *G01N 21/8806* (2013.01); *G01N 21/8851* (2013.01);
(Continued)

(58) Field of Classification Search
CPC ............ G01N 21/954; G01N 21/8806; G01N 21/8851; G01N 2021/8841; G01N 2021/8845; G01N 2021/8887
See application file for complete search history.

(56) References Cited

FOREIGN PATENT DOCUMENTS

| JP | 2007-285891 A | 11/2007 |
|----|---------------|---------|
| JP | 2009-184081 A | 8/2009  |

(Continued)

*Primary Examiner* — Jamil Ahmed
(74) *Attorney, Agent, or Firm* — Birch, Stewart, Kolasch & Birch, LLP

(57) ABSTRACT

There is provided a tubular body inner surface inspection apparatus that detects a defect existing on an inner surface of a tubular body, the apparatus including: a tubular body imaging apparatus including N (N≥2) imaging units each including a laser light source that applies laser light, an optical element that reflects laser light applied from the laser light source in a circumferential direction of the inner surface of the tubular body, as annular laser light, an area camera that images a region of the inner surface of the tubular body where the annular laser light is applied, and thereby generates an annular beam image, and a linking member that links together and fixes the laser light source and the area camera, in which the imaging units are linked in series along a tube axial direction of the tubular body in such a manner that positions of the linking members in a plane orthogonal to a tube axis are different from each other; a movement apparatus that moves the tubular body imaging apparatus along the tube axial direction of the tubular body; and an arithmetic processing apparatus that, while moving the tubular body imaging apparatus by means of the movement apparatus, performs image processing on a plurality of annular beam images generated in each of the imaging units and assesses whether a defect exists on the inner surface of the tubular body or not.

16 Claims, 28 Drawing Sheets

(52) U.S. Cl.
CPC .............. *G01N 2021/8841* (2013.01); *G01N 2021/8845* (2013.01); *G01N 2021/8887* (2013.01)

(56) References Cited

FOREIGN PATENT DOCUMENTS

| JP | 2012-159491 A | | 8/2012 | |
|----|---------------|---|--------|----------|
| JP | 2013169570 A | * | 9/2013 | ............ B21C 31/00 |
| JP | 2015-163844 A | | 9/2015 | |
| JP | 2017-53790 A | | 3/2017 | |

* cited by examiner

FIG.8
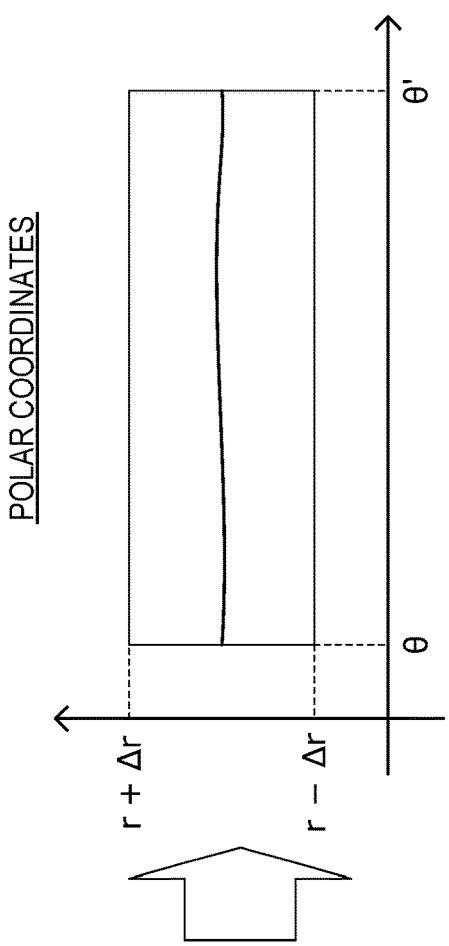
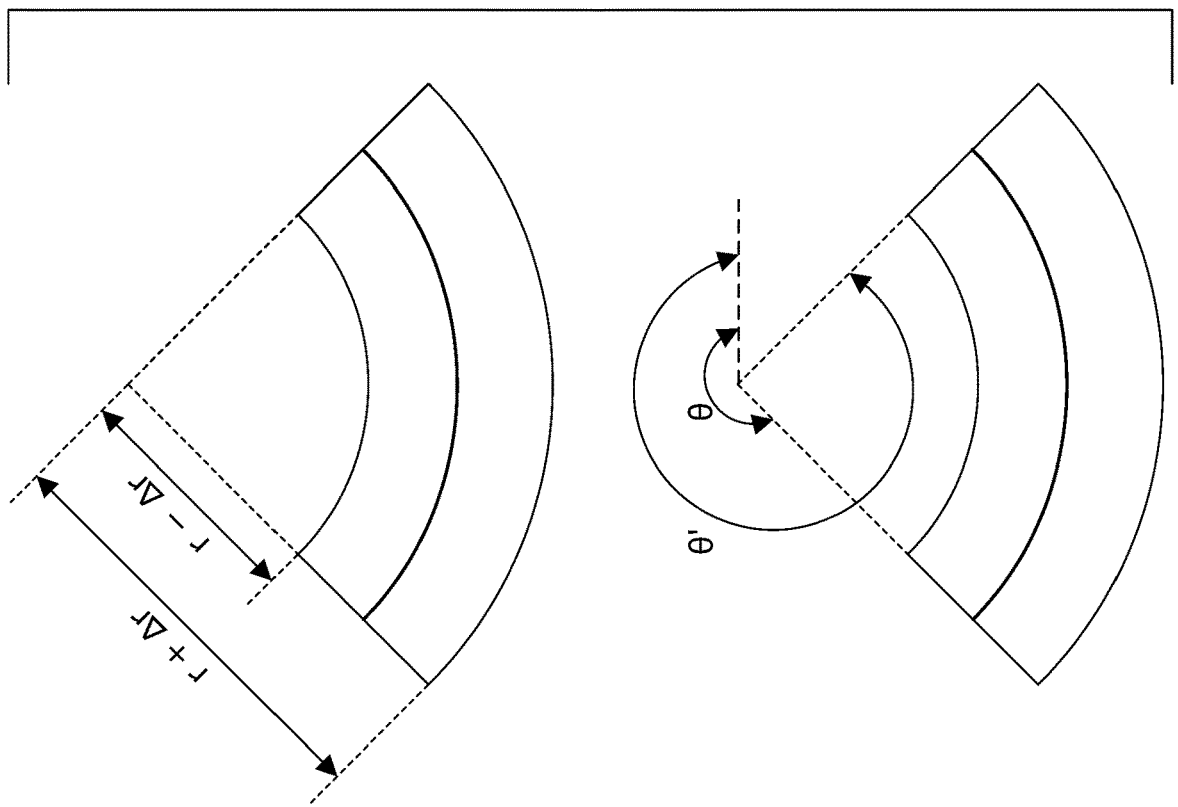

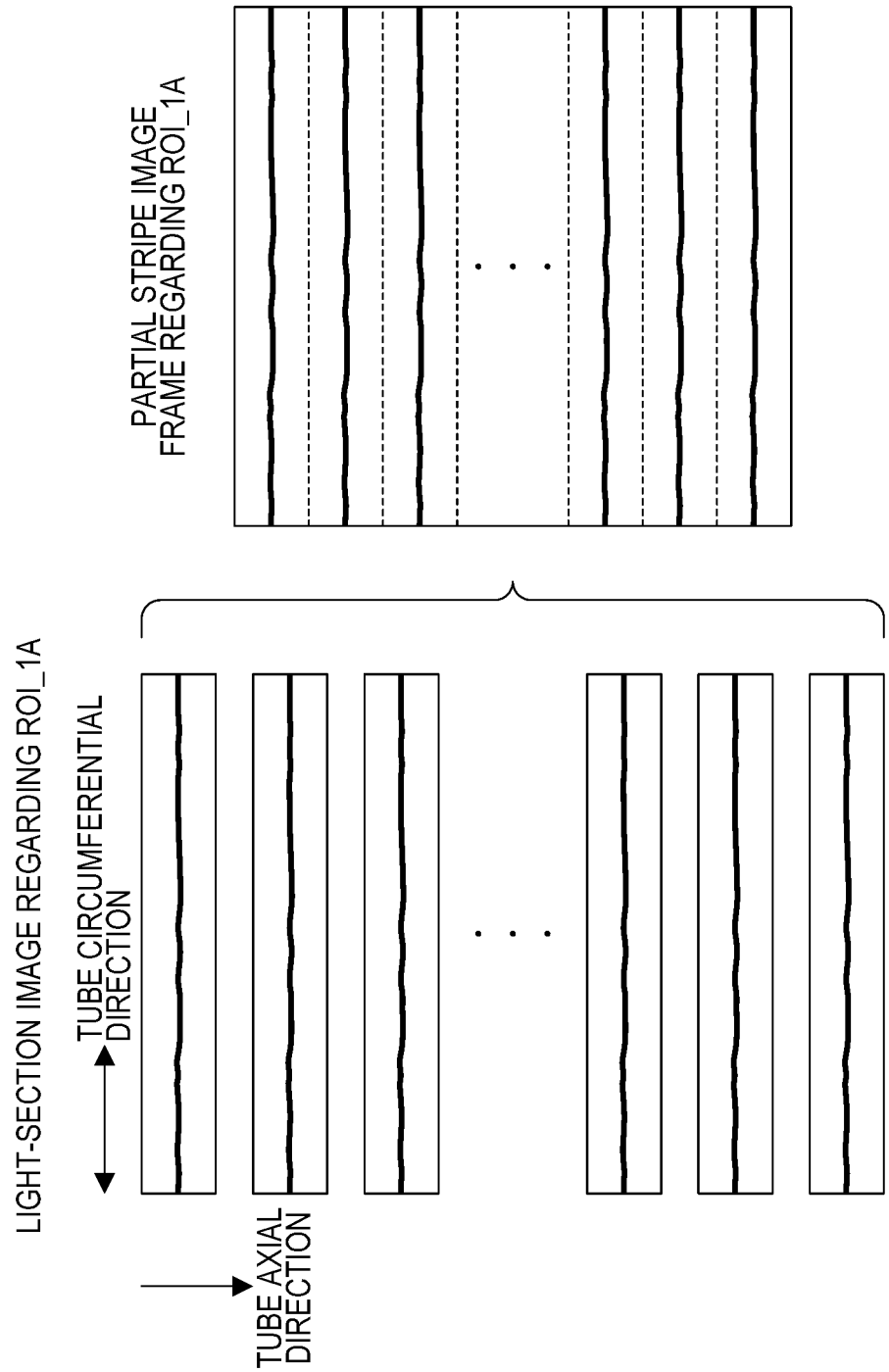

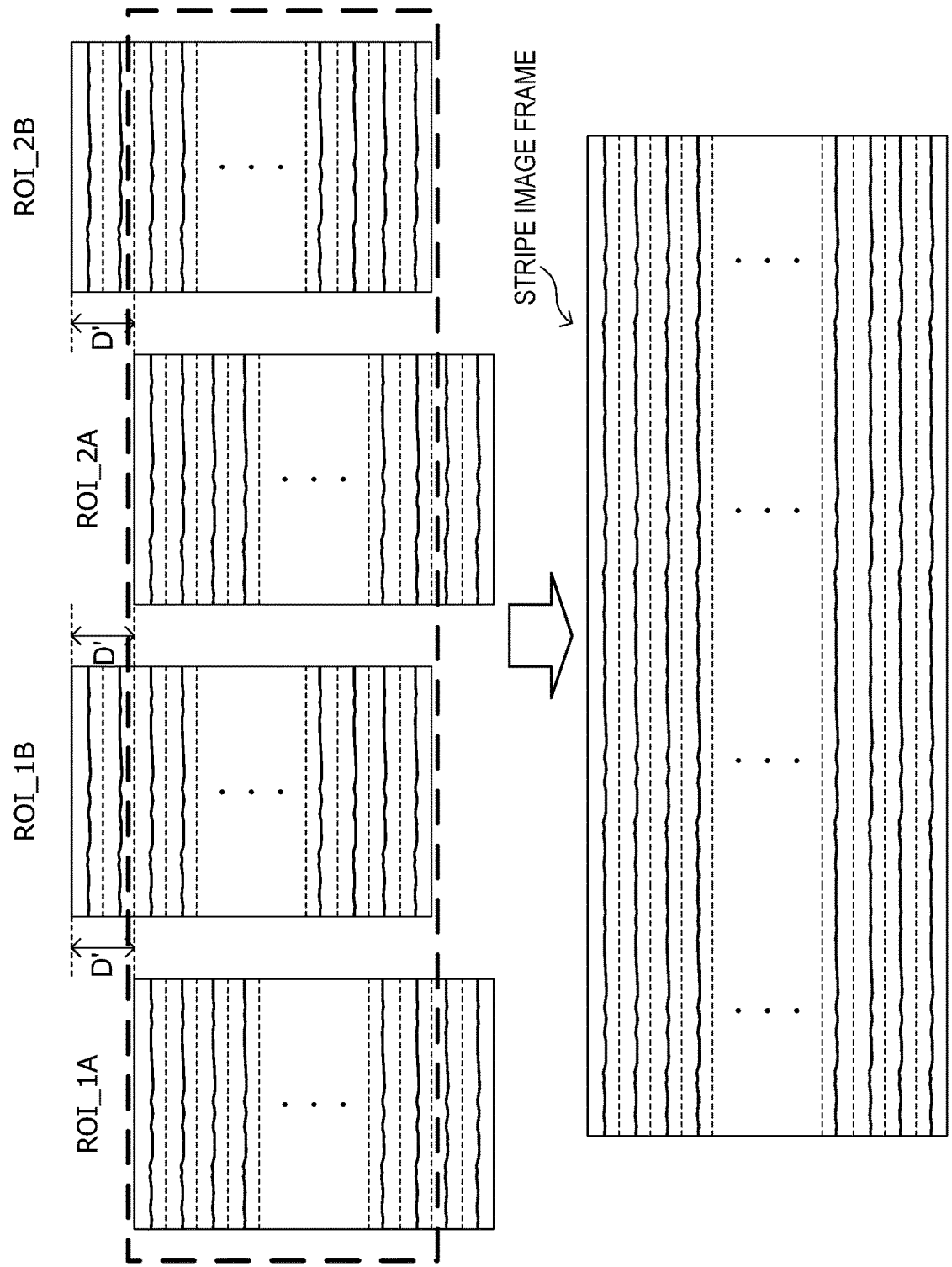

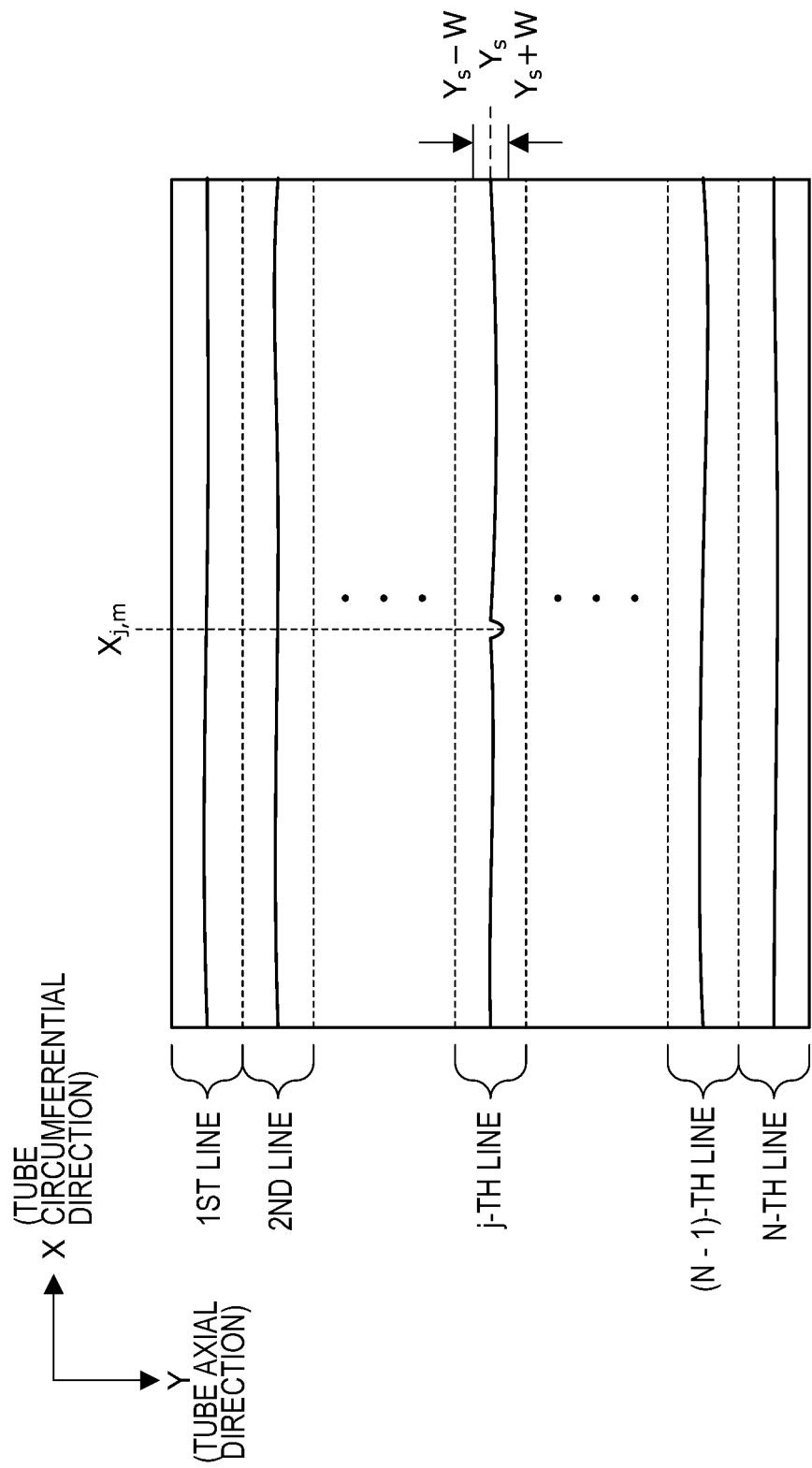

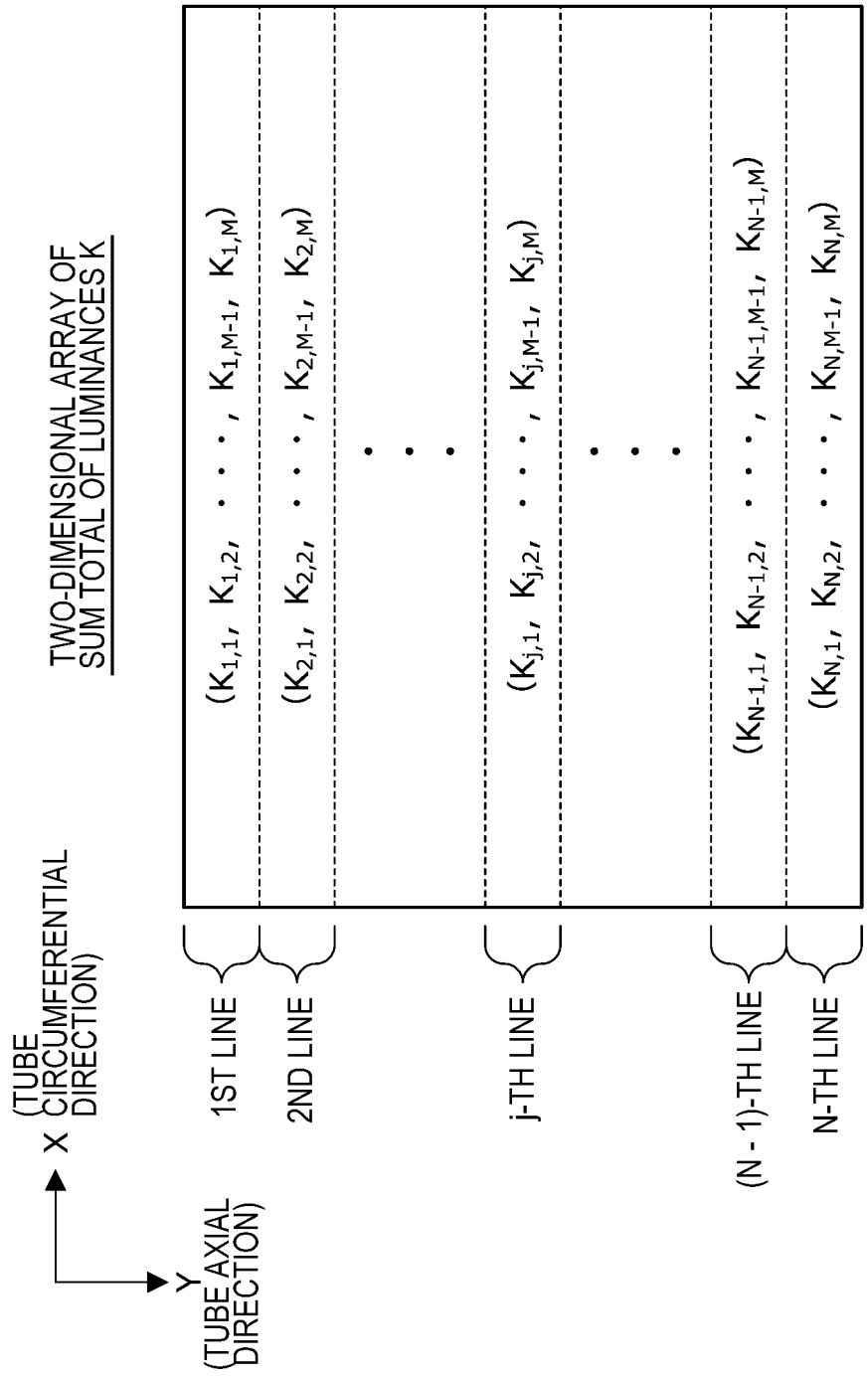

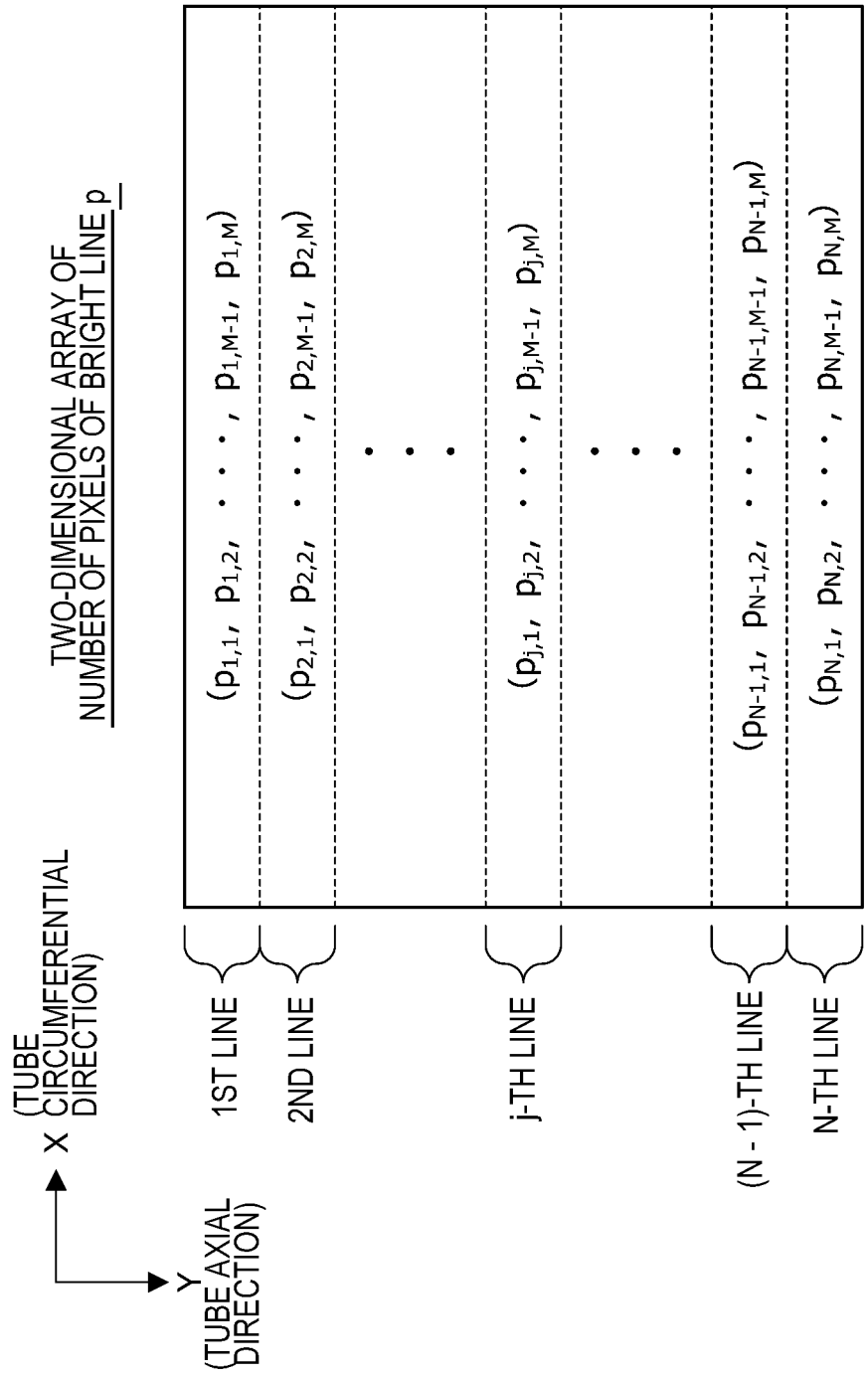

FIG.15

LOGIC TABLE FOR DEFECT DISCRIMINATION

|  | FEATURE VALUE B1 | FEATURE VALUE B2 | ... | FEATURE VALUE Bm |
|---|---|---|---|---|
| DEFECT A1 | CONDITION FORMULA C11 | CONDITION FORMULA C12 | ... | CONDITION FORMULA C1m |
| DEFECT A2 | CONDITION FORMULA C21 | CONDITION FORMULA C22 | ... | CONDITION FORMULA C2m |
| ... | ... | ... | ... | ... |
| DEFECT An | CONDITION FORMULA Cn1 | CONDITION FORMULA Cn2 | ... | CONDITION FORMULA Cnm |

TUBULAR BODY INNER SURFACE INSPECTION APPARATUS AND TUBULAR BODY INNER SURFACE INSPECTION METHOD

TECHNICAL FIELD

The present invention relates to a tubular body inner surface inspection apparatus and a tubular body inner surface inspection method.

BACKGROUND ART

An inner surface inspection of a tubular body that inspects the inner surface of a tubular body typified by a metal tube such as a steel tube or a resin pipe is an important inspection item particularly in metal tubes such as steel tubes, and usually a visual inspection is performed by additionally providing a process separately from the production process of the tubular body.

The visual inspection of a tubular body depends greatly on the skill of the inspector, and an adequate visual inspection is difficult to perform particularly in an inner surface inspection that inspects the inner surface of a tubular body. Hence, outflows of shameless flaws and serious complaints may occur particularly in a deep portion in the axial direction of the tubular body. In addition, there is also unevenness of the inner surface of a tubular body that is difficult to detect depending on the inspection technique; hence, it is important to monitor the inner surface of the tubular body directly.

As a method for inspecting such an inner surface of a tubular body, there is a method using an imaging optical system in which light of a light source is caused to be applied in a disc shape by means of a conical mirror or a conical prism, and the reflected light of the inner surface of a tubular body is imaged with an imaging element. As the method for inspecting such an inner surface of a tubular body, there are methods like those disclosed in JP 2007-285891A, JP 2012-159491A, and JP 2015-163844A.

For example, JP 2007-285891A discloses a technology in which an imaging optical system is constructed by illumination light produced by a light source that applies light of the light source in a disc shape by means of a conical mirror or a conical prism and an imaging system based on an imaging sensor; beams of light are applied one after another to the inner surface of an object to be inspected while the imaging optical system is moved concurrently; a trail of light showing the shape of the inner surface is obtained by the applied light; the trail of light is imaged with the imaging sensor; the distances between a standard position of the imaging optical system and portions of the inner surface of the object to be inspected are calculated one after another from light trail image data obtained by the imaging mentioned above; and thereby the shape of the inner surface of the object to be inspected is measured.

Further, JP 2012-159491A discloses an apparatus that applies annular laser light to the inner surface of a tubular body while moving along the axial direction of the tubular body and obtains a light-section image using the resulting annular beam image, and consequently detects unevenness flaws and figure-like flaws of the inner surface simultaneously and individually.

Further, JP 2015-163844A discloses an apparatus in which a light source section that applies laser light expanded in a ring shape to the inner surface of a body to be inspected and an imaging section that images the reflected light at the inner surface of the body to be inspected of the applied laser light are arranged so as to be coaxial by means of an optically transparent tube, and the transparent tube is provided with properties of controlling the state of polarization in order to suppress the occurrence of ghosts derived from the transparent tube at the time of imaging.

CITATION LIST

Patent Literature

Patent Literature 1: JP 2007-285891A
Patent Literature 2: JP 2012-159491A
Patent Literature 3: JP 2015-163844A

SUMMARY OF INVENTION

Technical Problem

Here, the frame rate at the time of imaging annular laser light depends on the performance of the camera used, and hence it is difficult to obtain light-section images one after another at high speed. In general, a two-dimensional area camera is used for the imaging of light-section images. In this case, imaging is performed including useless regions other than the laser light irradiation region of the inner surface of the tubular body necessary for inspection, and hence it is difficult to improve the imaging frame rate. Furthermore, also the time of transferring data not necessary for processing is needed; thus, a common two-dimensional area camera is not suitable for cases where it is intended to perform high speed inspection.

Furthermore, for example, in order to inspect a tubular body with an inner diameter of more than or equal to 250 mm, which is occasionally called a medium-diameter tube, it is necessary to increase the size of the captured image in order to perform imaging while ensuring the resolving power of the captured image (in other words, while ensuring the size of the captured image). As a consequence, the frame rate is reduced, and the imaging takes a long time.

In addition, when actually performing an inspection of a tubular body, a support member for supporting the light source is used; but to the area camera, annular laser light is blocked by the support member, and an unimaged region occurs.

In regard to the occurrence of the unimaged region mentioned above, in the technologies disclosed in JP 2007-285891A or JP 2015-163844A above, the shadow of the support member for supporting the light source can be eliminated, but it is impossible to completely exclude a voltage supply cable for the light source etc. Hence, in the technologies disclosed in JP 2007-285891A and JP 2015-163844A mentioned above, although the unimaged region can be made smaller, it is impossible to completely eliminate the unimaged region. Further, as the tubular body that is the object to be inspected becomes larger and longer, the spacing between the light source and the imaging section becomes wider; hence, in the technologies disclosed in JP 2007-285891A and JP 2015-163844A mentioned above, it becomes necessary to provide a support member that supports the light source and the imaging section in order to ensure the strength of the imaging optical system.

JP 2012-159491A above proposes, in regard to an unimaged region like that mentioned above, a technology in which an unimaged region is compensated for such that the imaging object region is changed between the forward way and the backward way of a test probe. However, to control the movement position of the test probe, the size of the apparatus may be increased, and simplicity may be reduced.

Thus, the present invention has been made in view of the problem mentioned above, and an object of the present invention is to provide a tubular body inner surface inspection apparatus and a tubular body inner surface inspection method capable of inspecting the inner surface of a tubular body at higher speed, with higher resolving power, and in a simpler way regardless of the size of the tubular body.

Solution to Problem

According to an aspect of the present invention in order to achieve the above-mentioned object, there is provided a tubular body inner surface inspection apparatus that detects a defect existing on an inner surface of a tubular body, the apparatus including: a tubular body imaging apparatus including N (N≥2) imaging units each including a laser light source that applies laser light, an optical element that reflects laser light applied from the laser light source in a circumferential direction of the inner surface of the tubular body, as annular laser light, an area camera that images a region of the inner surface of the tubular body where the annular laser light is applied, and thereby generates an annular beam image, and a linking member that links together and fixes the laser light source and the area camera, in which the imaging units are linked in series along a tube axial direction of the tubular body in such a manner that positions of the linking members in a plane orthogonal to a tube axis are different from each other; a movement apparatus that moves the tubular body imaging apparatus along the tube axial direction of the tubular body; and an arithmetic processing apparatus that, while moving the tubular body imaging apparatus by means of the movement apparatus, performs image processing on a plurality of annular beam images generated in each of the imaging units and assesses whether a defect exists on the inner surface of the tubular body or not.

The area camera in each of the imaging units preferably generates a plurality of annular beam images by imaging portions corresponding to regions of an entire visual field of the area camera where the annular laser light is not blocked by the linking member and furthermore corresponding to end regions of the entire visual field of the area camera, which end regions are set individually in end portions in a direction orthogonal to a pixel information transfer direction that is a direction in which pixel information that is information regarding a charge or a voltage of each pixel of an imaging element included in the area camera is transferred in the imaging element.

The arithmetic processing apparatus preferably uses an annular beam image obtained from each of the imaging units to calculate a centroid position and a radius of an irradiation portion of the annular laser light, performs a polar coordinate transformation on a coordinate system of annular beam images obtained from each of the imaging units, on the basis of the calculated centroid position and an amount of separation between the centroid position and the irradiation portion of the annular laser light, and generates, for each of the imaging units, light-section images each including a light-section line that is a line segment obtained by the polar coordinate transformation and corresponding to the irradiation portion of the annular laser light, generates partial stripe image frames in each of which obtained light-section images of each of the imaging units are sequentially arranged along the tube axial direction, adjusts the partial stripe image frames on the basis of a positional relationship between the N imaging units, connects the partial stripe image frames in planes orthogonal to the tube axis, and generates a stripe image frame, calculates a depth image showing unevenness condition of the inner surface of the tubular body and a luminance image showing luminance distribution of the annular laser light on the inner surface of the tubular body, on the basis of the stripe image frame, and detects a defect existing on the inner surface of the tubular body on the basis of the depth image and the luminance image.

The arithmetic processing apparatus preferably uses an annular beam image obtained from each of the imaging units to calculate a centroid position and a radius of an irradiation portion of the annular laser light, performs a polar coordinate transformation on a coordinate system of annular beam images obtained from each of the imaging units, on the basis of the calculated centroid position and an amount of separation between the centroid position and the irradiation portion of the annular laser light, and generates, for each of the imaging units, light-section images each including a light-section line that is a line segment obtained by the polar coordinate transformation and corresponding to the irradiation portion of the annular laser light, adjusts the obtained light-section images of the imaging units on the basis of a positional relationship between the N imaging units, connects the light-section images in planes orthogonal to the tube axis, and thereby generates a stripe image frame in which the connected light-section images are sequentially arranged along the tube axial direction, calculates a depth image showing unevenness condition of the inner surface of the tubular body and a luminance image showing luminance distribution of the annular laser light on the inner surface of the tubular body, on the basis of the stripe image frame, and detects a defect existing on the inner surface of the tubular body on the basis of the depth image and the luminance image.

A region mutually overlapping in a partial way preferably exists between annular beam images of imaging units.

Wavelengths of beams of laser light applied from the laser light sources in imaging units may be different from each other, and in a prior stage of the area camera in each of the imaging units, a wavelength selection filter that transmits light of the same wavelength as the wavelength of the beam of laser light of the laser light source included in the same imaging unit as the area camera may be provided.

The N imaging units may be linked such that the area camera, the laser light source, and the optical element are aligned in an alignment order of (an area camera, a laser light source, an optical element), (an optical element, a laser light source, an area camera), etc. between the plurality of imaging units.

The N imaging units may be linked such that the optical element, the laser light source, and the area camera are aligned in an alignment order of (an optical element, a laser light source, an area camera), (an area camera, a laser light source, an optical element), etc. between the plurality of imaging units.

The N imaging units may be linked such that the area camera, the laser light source, and the optical element repeat an alignment order of (an area camera, a laser light source, an optical element) between the plurality of imaging units.

According to another aspect of the present invention in order to achieve the above-mentioned object, there is provided a tubular body inner surface inspection method for detecting a defect existing on an inner surface of a tubular body, the method using a tubular body inner surface inspection apparatus including a tubular body imaging apparatus including N (N≥2) imaging units each including a laser light source that applies laser light, an optical element that reflects laser light applied from the laser light source in a circumferential direction of the inner surface of the tubular body, as annular laser light, an area camera that images a region of the inner surface of the tubular body where the annular laser light is applied, and thereby generates an annular beam image, and a linking member that links together and fixes the laser light source and the area camera, in which the imaging units are linked in series along a tube axial direction of the tubular body in such a manner that positions of the linking members in a plane orthogonal to a tube axis are different from each other, a movement apparatus that moves the tubular body imaging apparatus along the tube axial direction of the tubular body, and an arithmetic processing apparatus that, while moving the tubular body imaging apparatus by means of the movement apparatus, performs image processing on a plurality of annular beam images generated in each of the imaging units and assesses whether a defect exists on the inner surface of the tubular body or not, the method including: a step of using an annular beam image obtained from each of the imaging units to calculate a centroid position and a radius of an irradiation portion of the annular laser light; a step of performing a polar coordinate transformation on a coordinate system of annular beam images obtained from each of the imaging units, on the basis of the calculated centroid position and an amount of separation between the centroid position and the irradiation portion of the annular laser light, and generating, for each of the imaging units, light-section images each including a light-section line that is a line segment obtained by the polar coordinate transformation and corresponding to the irradiation portion of the annular laser light; a step of generating partial stripe image frames in each of which obtained light-section images of each of the imaging units are sequentially arranged along the tube axial direction, then adjusting the generated partial stripe image frames on the basis of a positional relationship between the N imaging units, connecting the partial stripe image frames in planes orthogonal to the tube axis, and generating a stripe image frame, or adjusting the obtained light-section images of the imaging units on the basis of the positional relationship between the N imaging units, connecting the light-section images in planes orthogonal to the tube axis, and thereby generating a stripe image frame in which the connected light-section images are sequentially arranged along the tube axial direction; a step of calculating a depth image showing unevenness condition of the inner surface of the tubular body and a luminance image showing luminance distribution of the annular laser light on the inner surface of the tubular body, on the basis of the stripe image frame; and a step pf detecting a defect existing on the inner surface of the tubular body on the basis of the depth image and the luminance image.

The area camera in each of the imaging units may generate a plurality of annular beam images by imaging portions corresponding to regions of an entire visual field of the area camera where the annular laser light is not blocked by the linking member and furthermore corresponding to end regions of the entire visual field of the area camera, which end regions are set individually in end portions in a direction orthogonal to a pixel information transfer direction that is a direction in which pixel information that is information regarding a charge or a voltage of each pixel of an imaging element included in the area camera is transferred in the imaging element.

A region mutually overlapping in a partial way preferably exists between annular beam images of imaging units.

Wavelengths of beams of laser light applied from the laser light sources in imaging units may be different from each other, and in a prior stage of the area camera in each of the imaging units, a wavelength selection filter that transmits light of the same wavelength as the wavelength of the beam of laser light of the laser light source included in the same imaging unit as the area camera may be provided.

The N imaging units may be linked such that the area camera, the laser light source, and the optical element are aligned in an alignment order of (an area camera, a laser light source, an optical element), (an optical element, a laser light source, an area camera), etc. between the plurality of imaging units.

The N imaging units may be linked such that the optical element, the laser light source, and the area camera are aligned in an alignment order of (an optical element, a laser light source, an area camera), (an area camera, a laser light source, an optical element), etc. between the plurality of imaging units.

The N imaging units may be linked such that the area camera, the laser light source, and the optical element repeat an alignment order of (an area camera, a laser light source, an optical element) between the plurality of imaging units.

Advantageous Effects of Invention

As described above, according to the present invention, it becomes possible to inspect the inner surface of a tubular body at higher speed, with higher resolving power, and in a simpler way regardless of the size of the tubular body.

BRIEF DESCRIPTION OF THE DRAWINGS

FIG. 8 is an explanatory diagram for describing coordinate transformation processing according to the embodiment;

FIG. 9 is an explanatory diagram showing an example of processing of generating a partial stripe image frame according to the embodiment;

FIG. 10 is an explanatory diagram showing an example of processing of generating a stripe image frame according to the embodiment;

FIG. 11A is an explanatory diagram for describing light-section line processing according to the embodiment;

FIG. 12B is an explanatory diagram showing a two-dimensional array of sum totals of luminances according to the embodiment;

FIG. 12C is an explanatory diagram showing a two-dimensional array of the numbers of pixels of bright lines according to the embodiment;

FIG. 15 is an explanatory diagram schematically showing an example of a logic table used in defect detection processing according to the embodiment;

DETAILED DESCRIPTION OF THE EMBODIMENT(S)

Figure 1:
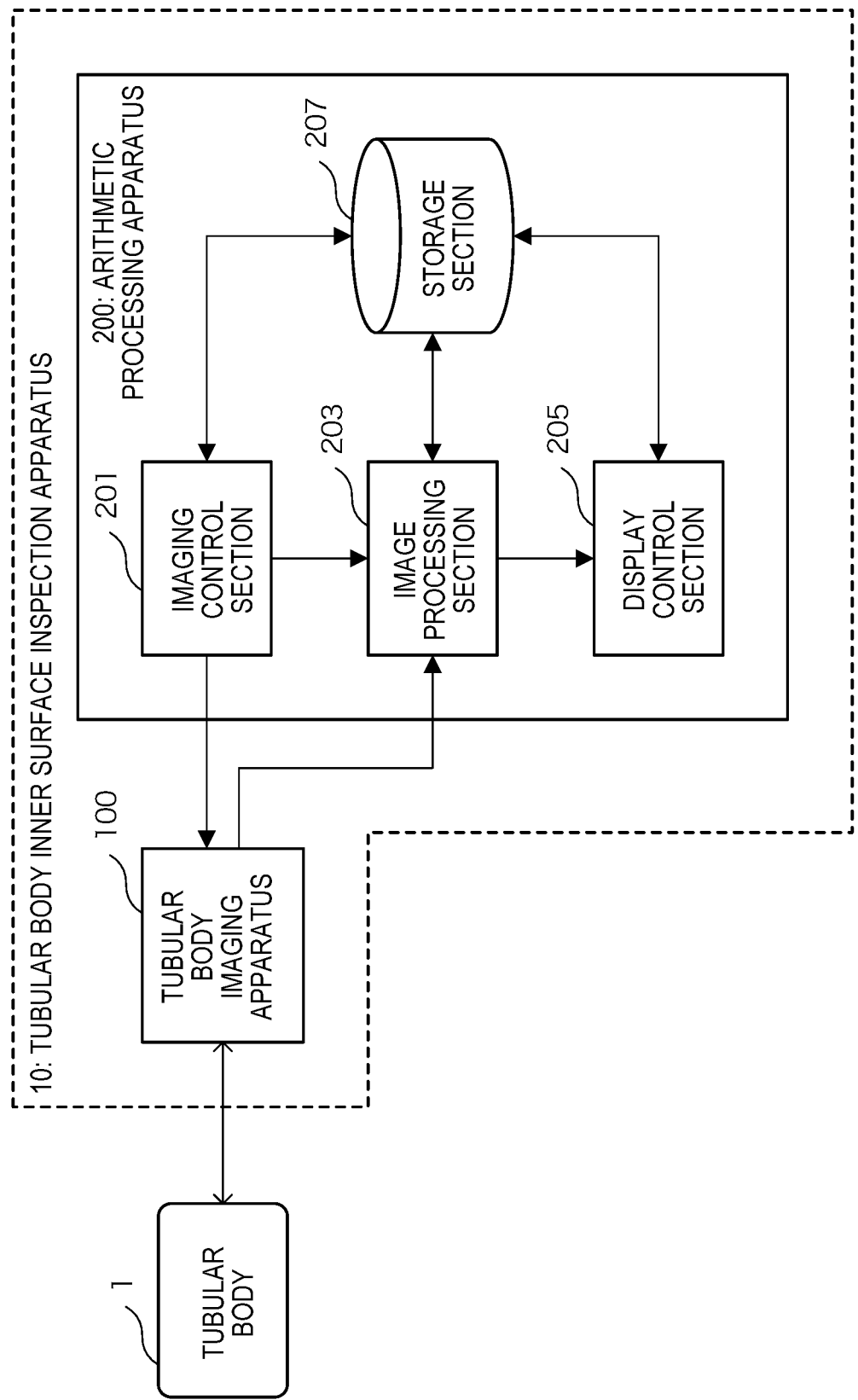
FIG. 1 is a block diagram schematically showing an overall configuration of a tubular body inner surface inspection apparatus according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

First Embodiment

<With Regard to Overall Configuration of Tubular Body Inner Surface Inspection Apparatus>

Figure 2:
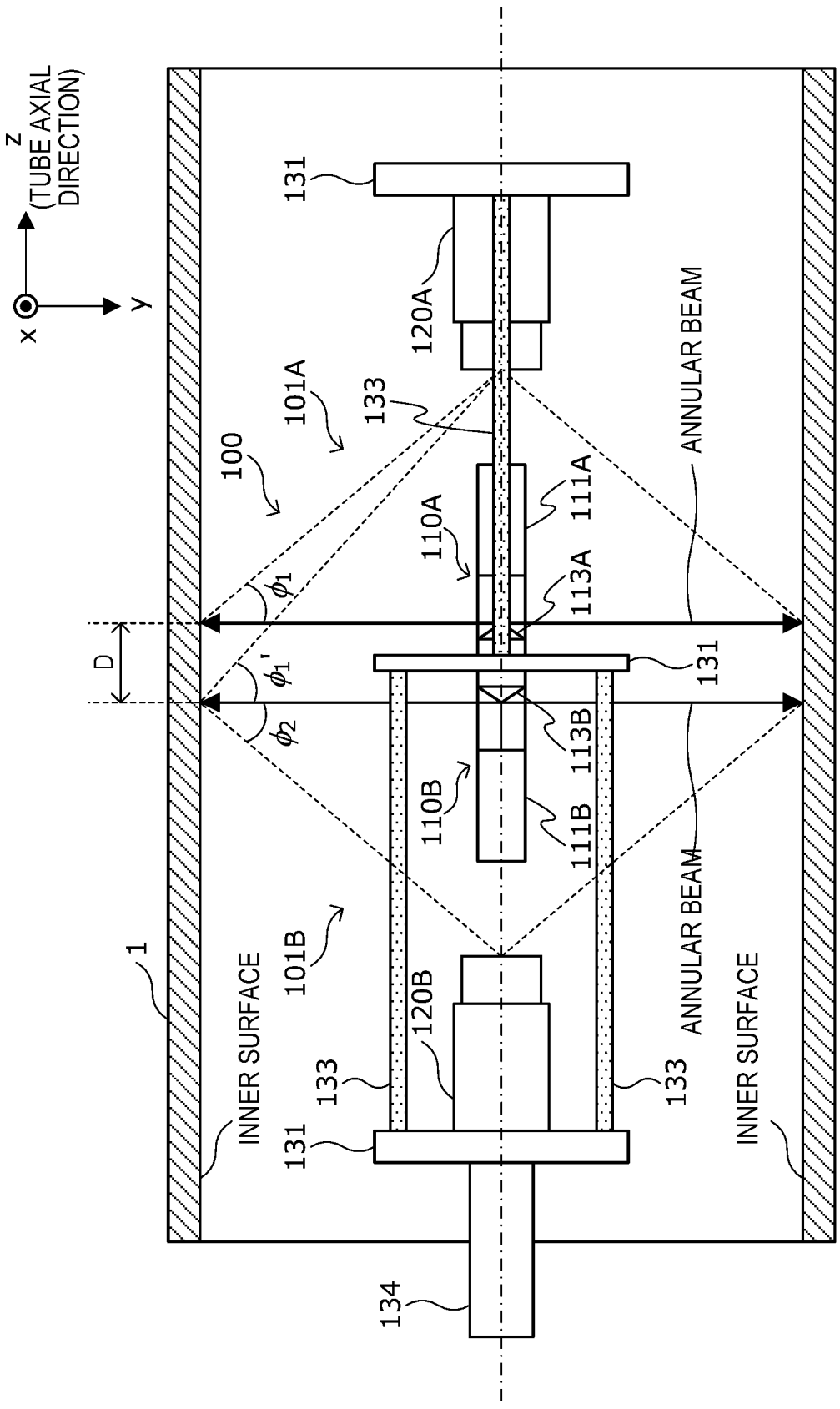
FIG. 2 is an explanatory diagram schematically showing an example of a configuration of a tubular body imaging apparatus according to the embodiment.

First, an overall configuration of a tubular body inner surface inspection apparatus 10 according to an embodiment of the present invention is described with reference to FIG. 1 and FIG. 2. FIG. 1 is an explanatory diagram showing an example of the configuration of the tubular body inner surface inspection apparatus 10 according to the present embodiment. FIG. 2 is an explanatory diagram schematically showing an example of the configuration of a tubular body imaging apparatus according to the present embodiment.

The tubular body inner surface inspection apparatus 10 according to the present embodiment is an apparatus that images the inner surface of a tubular body 1 and performs image processing on images obtained by imaging, and thereby inspects the inner surface of the tubular body 1. More specifically, the tubular body inner surface inspection apparatus 10 according to the present embodiment is an apparatus that inspects whether surface defects (unevenness flaws and figure-like flaws) exist on the inner surface of the tubular body 1 or not.

The tubular body 1 related to the present embodiment is not particularly limited as long as it is a tubular object having a hollow portion. Examples of the tubular body 1 include not only metal tubes and pipes typified by various steel tubes such as a spiral steel tube, an electro-resistance-welded steel tube, a UO steel tube, a seamless steel tube, a forge-welded steel tube, and a TIG-welded steel tube, but also tubular objects such as a cylinder referred to as a container used in a hot extrusion method.

The tubular body inner surface inspection apparatus 10 according to the present embodiment mainly includes, as shown in FIG. 1, a tubular body imaging apparatus 100 that images the inner surface of the tubular body 1, and an arithmetic processing apparatus 200 that performs image processing on images obtained by imaging.

The tubular body imaging apparatus 100 is placed in a hollow portion of the tubular body 1. The tubular body imaging apparatus 100 is an apparatus that sequentially captures images of the inner surface of the tubular body 1 along the tube axial direction while changing its position along the tube axial direction of the tubular body 1 at appropriate times, and outputs captured images obtained by imaging to the arithmetic processing apparatus 200. Here, a PLG signal is outputted from a pulse logic generator (PLG; a pulse-type speed detector) or the like to the arithmetic processing apparatus 200 in association with the movement of the tubular body imaging apparatus 100. The imaging timing etc. of the tubular body 1 of the tubular body imaging apparatus 100 are controlled by the arithmetic processing apparatus 200.

The tubular body imaging apparatus 100 will be described later in detail.

The arithmetic processing apparatus 200 is an apparatus that generates a stripe image frame using captured images generated by the tubular body imaging apparatus 100 and performs image processing on the stripe image frame, and thereby detects defects that can exist on the inner surface of the tubular body 1.

Also the arithmetic processing apparatus 200 will be described later in detail.

The tubular body inner surface inspection apparatus 10 according to the present embodiment may include, as well as the apparatuses shown in FIG. 1, a driving control apparatus that controls the movement in the tube axial direction of the tubular body imaging apparatus 100, for example. In this case, the driving control apparatus controls the movement in the tube axial direction of the tubular body imaging apparatus 100 by controlling the movement of a support bar 134 (see FIG. 2) that supports the tubular body imaging apparatus 100, under the control of the arithmetic processing apparatus 200.

<With Regard to Configuration of Tubular Body Imaging Apparatus 100>

Next, the configuration of the tubular body imaging apparatus 100 according to the present embodiment is described in detail with reference to FIG. 2 to FIG. 5B. FIG. 2 are explanatory diagrams schematically showing an example of the configuration of the tubular body imaging apparatus according to the present embodiment. FIG. 3A to FIG. 5B are explanatory diagrams for describing the tubular body imaging apparatus according to the present embodiment.

The tubular body imaging apparatus 100 according to the present embodiment has a structure in which two imaging units 101 each including an illumination mechanism 110, an area camera 120, holding substrates 131 to which the illumination mechanism 110 and the area camera 120 are individually fixed, and linking members 133 each of which is a support column linking the two holding substrates 131 are linked together in the tube axial direction of the tubular body 1. As schematically shown in FIG. 2, the two imaging units 101 share the holding substrate 131 on the side where the respective illumination mechanism 110 is attached, and are linked together in series such that the two imaging units 101 face each other along the tube axial direction and the position of the linking member 133 in a plane orthogonal to the tube axis is different between the imaging units 101 (preferably shifted by 90°).

Providing two imaging units 101 as shown in FIG. 2 leads to an increase in cost. Furthermore, in a conventional inspection apparatus, the imaging of the unimaged region mentioned above is enabled by rotating the inspection apparatus during transition from the time of sending-in to the time of sending-out of the inspection apparatus. Thus, it has so far been impossible to call to mind the idea of providing two imaging units 101 like in the tubular body imaging apparatus 100 according to the present embodiment.

Hereinafter, the two imaging units 101 included in the tubular body imaging apparatus 100 are referred to as an imaging unit 101A (a first imaging unit) and an imaging unit 101B (a second imaging unit), for the sake of convenience. Further, the illumination mechanism 110 and the area camera 120 in the imaging unit 101A may be distinguished as an illumination mechanism 110A and an area camera 120A, for the sake of convenience. Similarly, the illumination mechanism 110 and the area camera 120 in the imaging unit 101B may be distinguished as an illumination mechanism 110B and an area camera 120B, for the sake of convenience.

In the following, first, the members constituting each imaging unit 101 are described in detail.

The illumination mechanism 110 is a mechanism that applies prescribed light to the inner surface of the tubular body 1, and thereby illuminates the inner surface of the tubular body 1. The illumination mechanism 110 includes at least a laser light application device that applies annular laser light toward the entire circumference of the inner surface of the tubular body 1.

The laser light application device is a device that applies annular laser light (hereinafter, occasionally referred to as an "annular beam") along the tube circumferential direction of the inner surface of the tubular body 1, and includes, as shown in FIG. 2, a laser light source 111 and an optical element 113 in a conical shape.

The laser light source 111 is a light source that oscillates laser light having a prescribed wavelength. As such a laser light source 111, for example, a CW laser light source that performs laser oscillation continuously may be used. The wavelength of the light oscillated by the laser light source 111 is not particularly limited, but is preferably, for example, a wavelength in the visible light region of approximately 400 nm to 800 nm. The laser light source 111 oscillates laser light on the basis of an application timing control signal sent out from the arithmetic processing apparatus 200 described later, and applies laser light along the tube axial direction of the tubular body 1.

The optical element 113 in a conical shape is an optical element including a conical mirror or prism, and is installed such that the apex of the conical portion faces the laser light source 111. Spot-shaped laser light emitted from the laser light source 111 is reflected by the apex of the conical portion of the optical element 113, and a line beam is generated in a ring shape on the inner surface of the tubular body 1. Here, in the case where the cone angle of the conical portion is 90°, as shown in FIG. 2, an annular beam is applied in a direction at a right angle to the direction of laser incidence from the laser light source 111.

As shown in FIG. 2, the area camera 120 is provided on the back side of the illumination mechanism 110 with respect to the direction in which the illumination mechanism 110 applies light along the tube axial direction. An imaging element such as a charge-coupled device (CCD) or a complementary metal oxide semiconductor (CMOS) device is mounted in the area camera 120. The area camera 120 may be a monochrome camera, or may be a color camera. As shown in FIG. 2, each of the area cameras 120A and 120B images, from a direction of an angle of φ1 and φ2, an annular beam applied perpendicularly to the inner surface of the tubular body 1, and generates, from captured images of the annular beam on the inner surface, annular beam images that are images corresponding to imaging object regions (what is called regions of interest (ROI)) described later.

The area camera 120 according to the present embodiment is a camera in which prescribed regions out of the entire imageable visual field can be exclusively set as imaging object regions (ROI). In the imaging element provided in the area camera 120, in general, the processing of transferring the charge stored in each pixel of the imaging element (in the case where the imaging element is a CCD) or the processing of transferring the voltage of each pixel of the imaging element (in the case where the imaging element is a CMOS device) is performed along a prescribed direction of the imaging element (for example, the horizontal direction in the array of pixel groups constituting the imaging element, or the vertical direction that is a direction orthogonal to the horizontal direction). Here, information regarding the charge stored in each pixel of the imaging element or information regarding the voltage of each pixel of the imaging element may hereinafter be referred to as "pixel information," and the direction in which the pixel information is transferred may hereinafter be referred to as a "pixel information transfer direction." The pixel information transfer direction in the imaging element is an item fixed in advance during the production etc. of the imaging element, and can be grasped in advance by referring to the specification etc. of the imaging element.

In a case where, for example, an imaging element in which the pixel information transfer direction is the horizontal direction is provided in the area camera 120, imaging object regions (ROI) are set in the area camera 120 in, out of the entire imageable visual field, partial areas in the vertical direction that is a direction perpendicular to the pixel information transfer direction, for example. For the partial areas in the vertical direction of the captured image set as imaging object regions (ROI), the area camera 120 can exclusively extract images of the partial areas in the vertical direction set as imaging object regions (ROI) from the entire imageable visual field by transferring pixel information regarding the charge or the voltage of each pixel of the imaging element in the horizontal direction. By extracting only images of the partial areas in the vertical direction set as imaging object regions (ROI) from the entire imageable visual field, the time of transferring pixel information can be shortened as compared to the case where an imaging object region (ROI) is not set. As a result, in the tubular body imaging apparatus 100 according to the present embodiment, it becomes possible to image the inner surface of the tubular body 1 at a higher imaging frame rate, and accordingly it becomes possible to image the inner surface of the tubular body 1 at higher speed.

The focal distance and the angle of view of the lens mounted in the area camera 120 and the distance between the illumination mechanism 110 and the imaging element of the area camera 120 are not particularly limited, but are preferably selected such that the entire image of the annular beam applied to the inner surface of the tubular body 1 can be captured. The size and the pixel size of the imaging element mounted in the area camera 120 are not particularly limited either; but when considering the image quality of the generated image, the image resolving power, etc., it is preferable to use a large-sized imaging element. Further, from the viewpoint of image processing described below, the line width of the annular beam is preferably adjusted so as to be approximately one to three pixels on the imaging element. It is important that various imaging conditions such as the focal distance and the angle of view of the lens and the distance between the illumination mechanism 110 and the imaging element of the area camera 120 be the same setting between the area camera 120A and the area camera 120B.

Such an illumination mechanism 110 and such an area camera 120 are arranged such that the center axis of the laser light applied from the illumination mechanism 110 and the center axis (the optical axis) of the area camera 120 are coaxial, and are fixed to the two holding substrates 131.

In the tubular body imaging apparatus 100 according to the present embodiment, two imaging units 101 like those mentioned above are provided, and the imaging units 101A and 101B are linked together in series such that the position of the linking member 133 in a plane orthogonal to the tube axis is different between the imaging units. Hence, the regions blocked by the linking member 133A and the linking member 133B in the visual fields of the area camera 120A and the area camera 120B, respectively, are different in a plane orthogonal to the tube axis. Therefore, if the inner surface of the tubular body 1 is scanned and imaged by both of the area camera 120A and the area camera 120B, the entire inner surface can be imaged without a loss of the visual field. In particular, if the two imaging units 101A and 101B are linked together in series such that the linking member 133A and the linking member 133B are shifted from each other by 90° in a plane orthogonal to the tube axis, waste is avoided in arithmetic processing described later; thus, this is efficient and favorable.

Here, in the imaging units 101, the relation of $|\varphi_1|=|\varphi_2|$ holds for the angles $\varphi_1$ and $\varphi_2$ each of which is the angle between the annular beam and the boundary line defining the angle of view of the area camera 120. Each of the angles $|\varphi_1|$ and $|\varphi_2|$ may be set to an arbitrary value, but is preferably set to approximately 30 to 60 degrees, for example. This is because, if the angle is set too large, the scattered light (reflected light) of the annular beam from the inner surface of the tubular body 1 is weakened; and if the angle is set small, the amount of movement of a stripe in a stripe image described later is reduced with respect to the amount of change in depth of the tubular body 1 that is the object to be inspected, and information regarding the depth of a concavity (or the height of a convexity) existing on the inner surface of the tubular body 1 is degraded.

Here, in the case where the wavelengths of the annular beams applied from the imaging units 101A and 101B are equal to each other, it is preferable that the irradiation positions of the annular beams on the inner surface be separate by a prescribed magnitude of d as schematically shown in FIG. 2. In view of the amount of variation in the irradiation position of the annular beam associated with unevenness that can exist on the inner surface of the tubular body 1, the magnitude of the offset D is preferably set to a value larger than this amount of variation. This is because, if the magnitude of the offset D is set to a value smaller than the amount of variation, it is impossible to distinguish between the variation derived from unevenness that can exist in the irradiation position of the annular beam of the imaging unit 101A and the variation derived from unevenness that can exist in the irradiation position of the annular beam of the imaging unit 101B.

If the offset D is too large, the size of the tubular body imaging apparatus 100 may be too large, and the handling of the apparatus may be difficult. Further, to inspect the entire tube axial direction of the inner surface of the tubular body, it is required that the tubular body imaging apparatus 100 be moved along the tube axial direction longer than the full length of the tubular body by at least the offset D. However, if a case where the tubular body imaging apparatus 100 cannot be moved sufficiently long occurs due to facility restrictions etc., a region that cannot be inspected occurs in an end portion of the tubular body. Thus, it is preferable that the magnitude of the offset D be set so as to prevent a situation where a region that cannot be inspected occurs in an end portion of the tubular body due to facility restrictions etc.

If the offset D is too small, as mentioned above, the two annular beams seen from one area camera 120 overlap in a part where unevenness has occurred, and correct imaging is difficult. Here, each of the maximum depth and the maximum height of the unevenness to be detected is denoted by $h_{max}$. Further, in FIG. 2, the angle of view when the irradiation position of the annular beam of the imaging unit 101B is viewed with the area camera 120A of the imaging unit 101A is denoted by $\varphi_1'$. At this time, when the offset D is small, it can be assumed that the angle $|\varphi_1'|\approx|\varphi_1|$. On the other hand, as described below, the relation of $\Delta d=\Delta h\cdot \sin\varphi$ holds for the amount of displacement $\Delta d$ of the light-section line derived from the irradiation position of the annular beam and the depth/height $\Delta h$ of the unevenness that has occurred on the inner surface of the tubular body. Hence, in order for the two annular beams not to overlap, it is preferable that the relation of $D>2\cdot h_{max}\times\sin\varphi_1$ hold. For example, when the angle $|\varphi_1|=45°$ and $h_{max}=5$ mm, the magnitude of the offset D is preferably larger than $2\times 5\times\sin 45°=7.1$ mm.

In the case where the wavelengths of the annular beams applied from the imaging units 101A and 101B are different from each other, the value of an offset D like that shown in FIG. 2 may be set as appropriate. In each imaging unit 101, a wavelength selection filter that transmits light of the same wavelength as the wavelength of the laser light in the imaging unit 101 may be placed in a prior stage of the imaging element included in the area camera 120 in the imaging unit 101; thereby, the annular beam from the illumination mechanism 110 included in each imaging unit 101 can be selectively caused to form an image in the imaging unit 101. This is because, by this measure, color mixing of annular beams between the imaging units 101 can be prevented, and the variation derived from unevenness that can exist in the irradiation position of the annular beam of the imaging unit 101A and the variation derived from unevenness that can exist in the irradiation position of the annular beam of the imaging unit 101B can be distinguished.

The tubular body imaging apparatus 100 including two imaging units 101A and 101B like those mentioned above is supported by the support bar 134 as schematically shown in FIG. 2; the inner surface of the tubular body 1 can be scanned and imaged while the support bar 134 is made to function as a movement apparatus that moves the tubular body imaging apparatus 100 in the tube axial direction and the illumination mechanisms 110A and 110B and the area cameras 120A and 120B are moved in the tube axial direction so as to substantially agree with the center axis of the tubular body 1, under the control of the arithmetic processing apparatus 200.

Here, the arithmetic processing apparatus 200 described later outputs a trigger signal for imaging to the area cameras 120A and 120B each time the tubular body imaging apparatus 100 moves a prescribed distance in the tube axial direction. The movement interval in the tube axial direction of the illumination mechanism 110 and the area camera 120 may be set as appropriate, but is preferably set equal to the pixel size of the imaging element provided in the area camera 120, for example. By making the movement interval in the tube axial direction and the pixel size of the imaging element agree, the resolving power in the vertical direction and the resolving power in the horizontal direction can be made to agree in the captured image.

The material of the holding substrate 131 is preferably selected in accordance with the strength etc. required of the tubular body imaging apparatus 100, as appropriate. The material of the linking member 133 is not limited as long as the tubular body imaging apparatus 100 does not bend, and a material that can be regarded as transparent to the wavelength of the annular beam, such as glass, may be used. For the number of linking members 133, although in FIG. 2 a case where two linking members 133 exist is shown, the number of linking members 133 may be set in accordance with the strength required of the tubular body imaging apparatus 100 as appropriate, and the number may also be one, or more than or equal to three.

As mentioned above, imaging object regions (ROI) are set in each of the area cameras 120A and 120B; in the case where three or more linking members 133 are provided, the linking members 133 are preferably arranged in an edge portion of the holding substrate 131 along the tube circumferential direction of the holding substrate 131 in such a manner that the placement position of each linking member 133 is included in a region of the imaging visual field where an imaging object region (ROI) is not set.

Figure 3A:
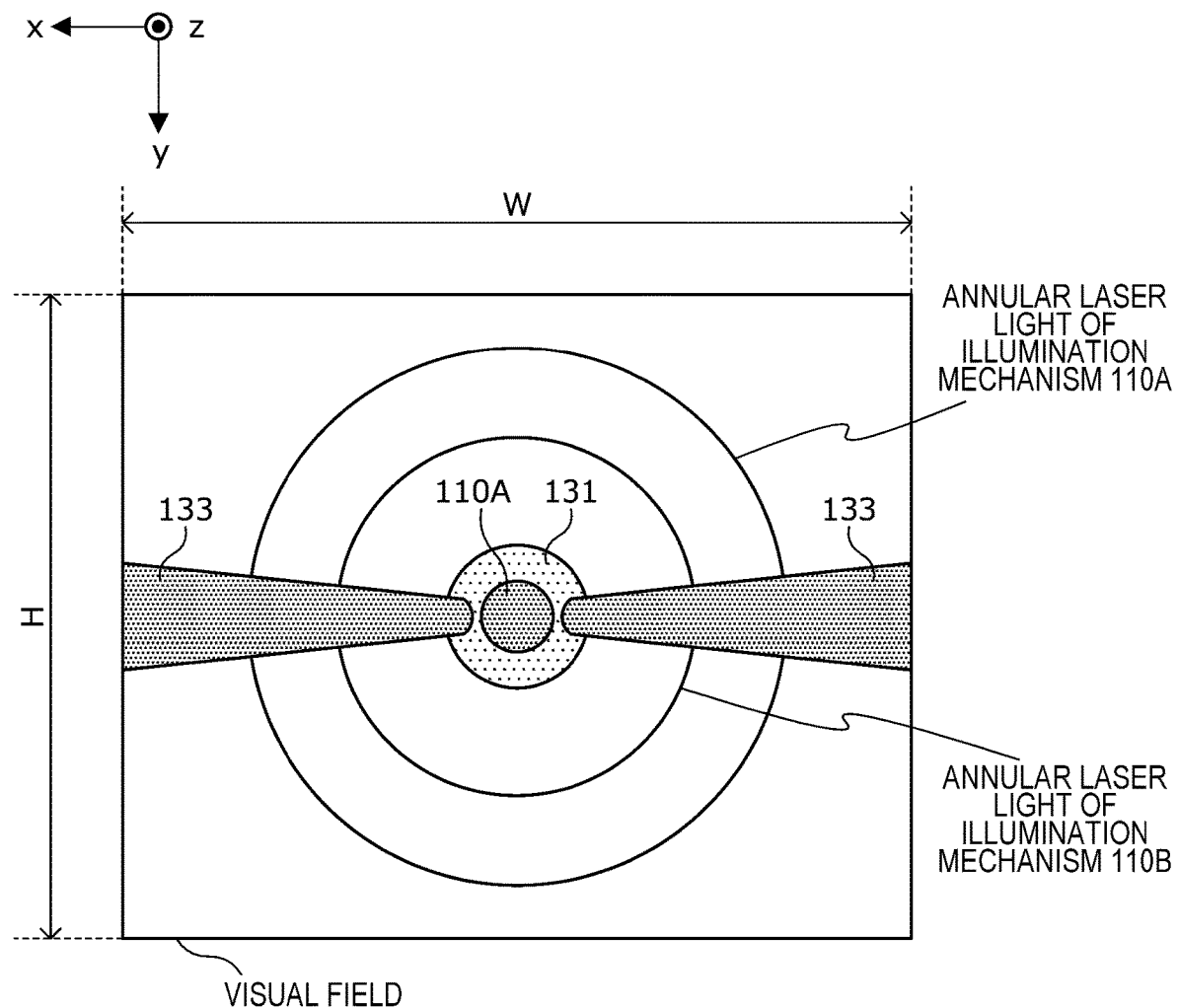
FIG. 3A is an explanatory diagram for describing a tubular body imaging apparatus according to the embodiment.
Figure 3B:
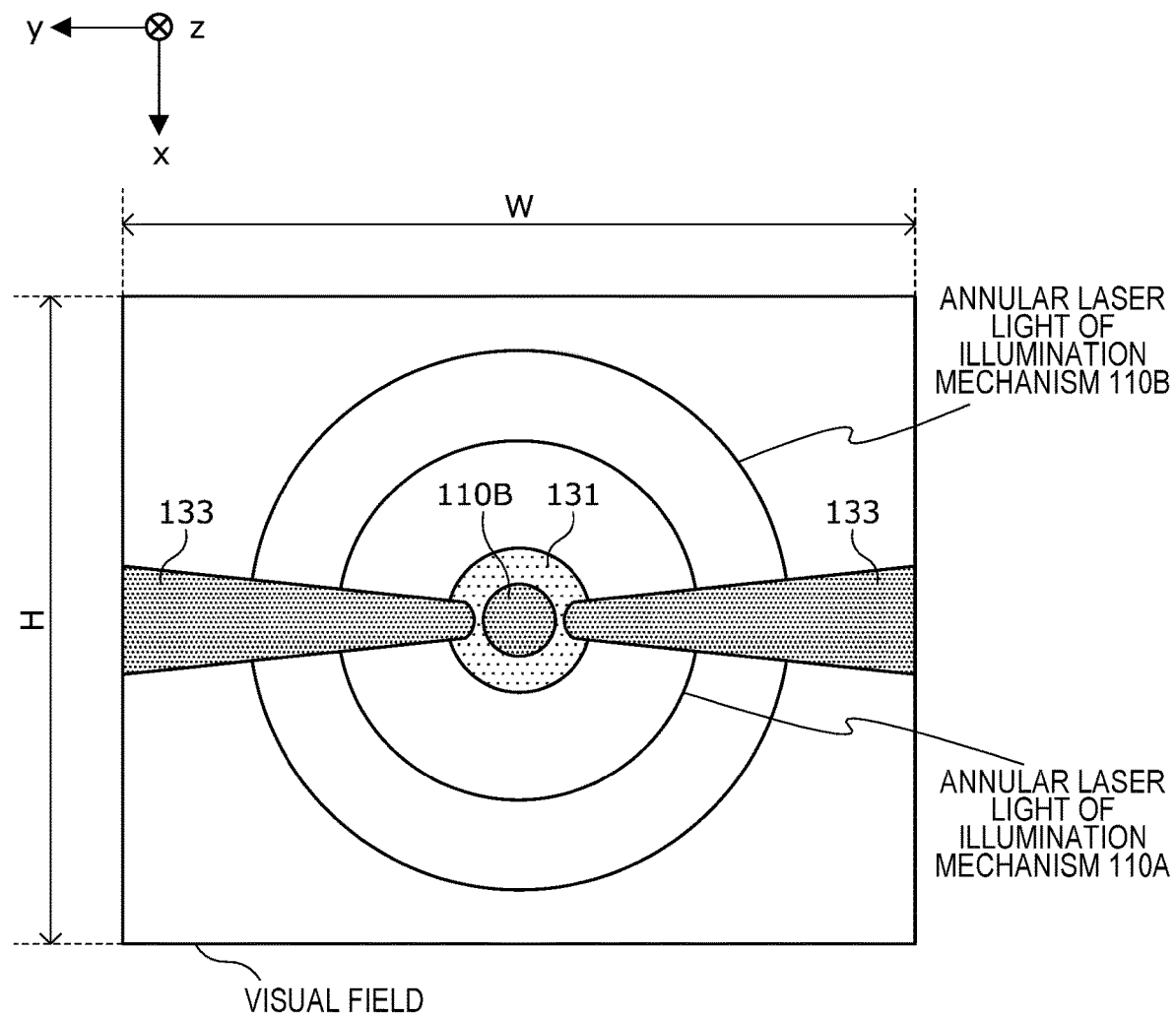
FIG. 3B is an explanatory diagram for describing a tubular body imaging apparatus according to the embodiment.

FIG. 3A and FIG. 3B schematically show situations of the visual fields of the area cameras 120 in the time of sending-in. FIG. 3A and FIG. 3B are shown on the basis of (not the horizontality and verticality of the imaging unit) verticality and horizontality with respect to the verticality and horizontality of the area camera 120 (more specifically, verticality and horizontality in the imaging element provided in the area camera 120).

Figure 4A:
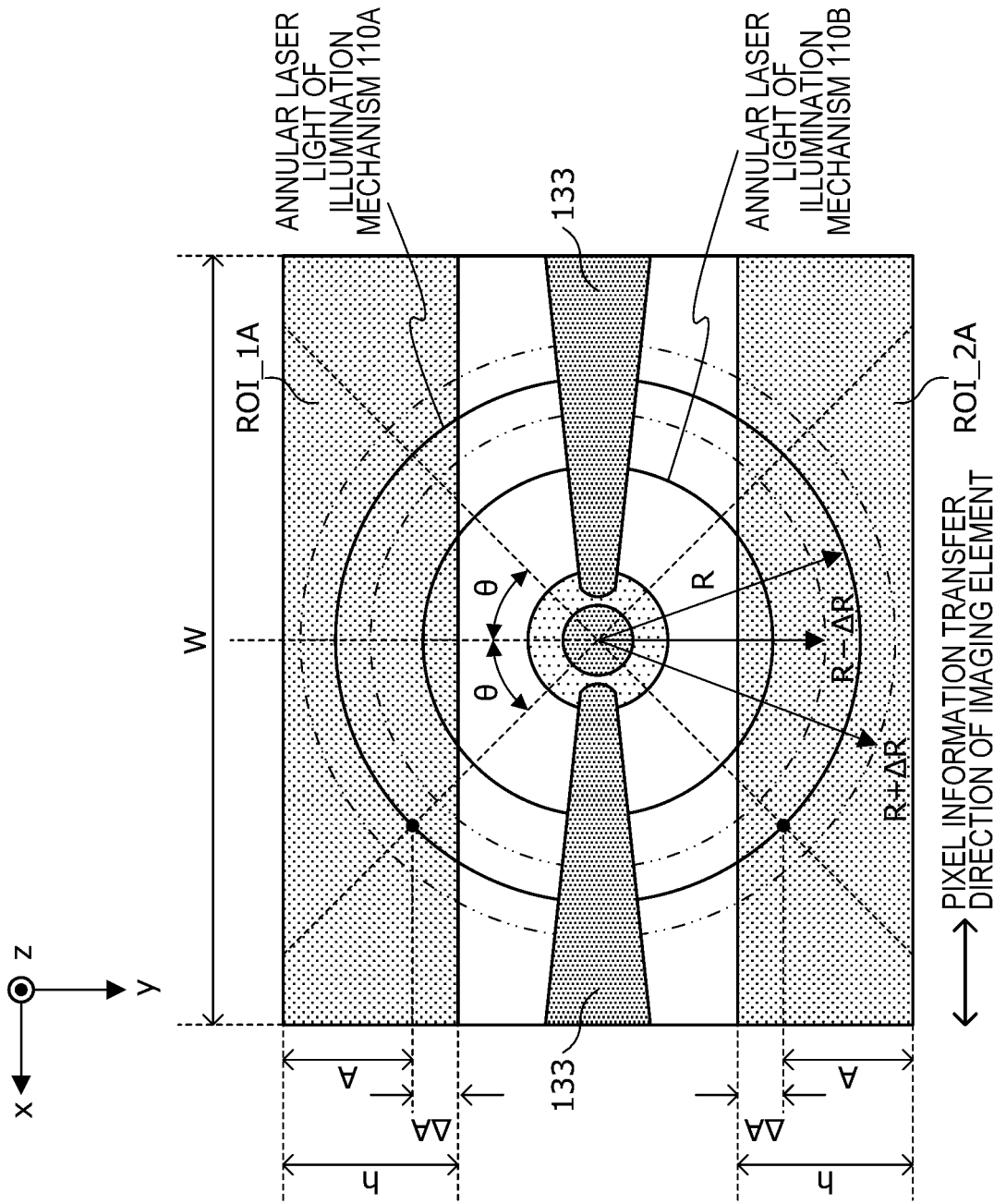
FIG. 4A is an explanatory diagram for describing a tubular body imaging apparatus according to the embodiment.
Figure 4B:
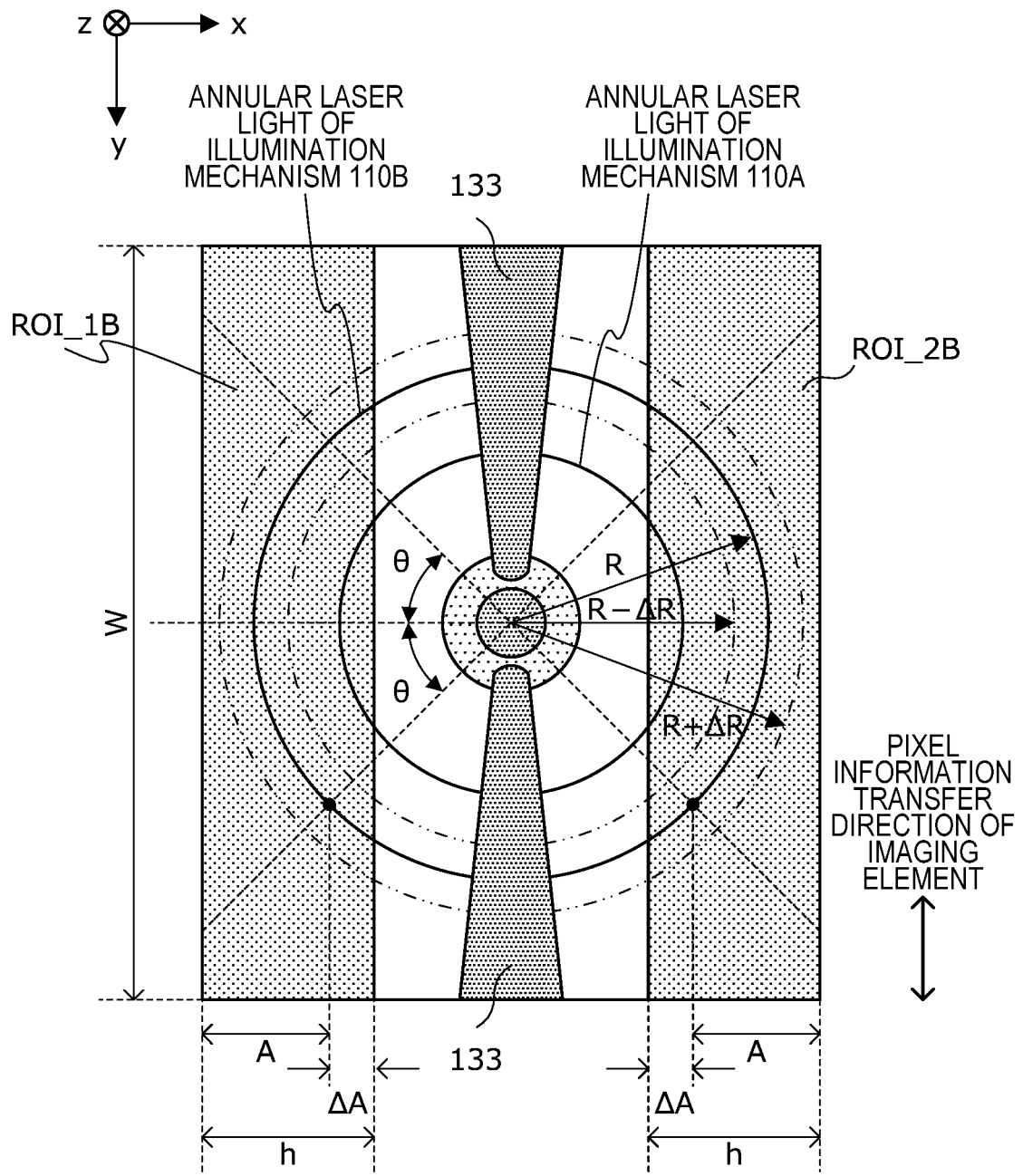
FIG. 4B is an explanatory diagram for describing a tubular body imaging apparatus according to the embodiment.

In a tubular body imaging apparatus 100 like that mentioned above, as schematically show in FIG. 3A and FIG. 3B, the illumination mechanism 110, the holding substrate 131, and the linking members 133 exist in addition to annular laser light applied from each of the illumination mechanisms 110A and 110B in the visual field of each of the area cameras 120 (vertical-direction pixels×horizontal-direction pixels with respect to the area camera 120=H pixels×W pixels). Further, parts of the annular beam on the inner surface are blocked by the linking members 133, and regions where annular laser light cannot be observed have occurred. In the tubular body imaging apparatus 100 according to the present embodiment, as schematically shown in FIG. 4A and FIG. 4B, two imaging object regions ROI for treating only prescribed regions out of the entire imageable visual field are set for each of the area cameras 120 in both end regions in a direction (in the case of FIG. 4A and FIG. 4B, the vertical direction) orthogonal to the pixel information transfer direction of the imaging element (in the case of FIG. 4A and FIG. 4B, the horizontal direction), for the purposes of increasing the speed of imaging processing while maintaining high resolution and coping with the occurrence of regions where annular laser light cannot be observed due to the linking members 133. That is, out of the image captured by the area camera 120, only images corresponding to the imaging object regions ROI are treated as annular beam images, and are transmitted to the arithmetic processing apparatus 200; thereby, image processing described later is performed.

Here, the imaging object regions ROI set in the area camera 120A are referred to as ROI_1A and ROI_2A for the sake of convenience, and the imaging object regions ROI set in the area camera 120B are referred to as ROI_1B and ROI_2B for the sake of convenience. Further, portions corresponding to ROI_1A and ROI_1B are referred to as the upper side in the entire imageable visual field for the sake of convenience, and portions corresponding to ROI_2A and ROI_2B are referred to as the lower side in the entire imageable visual field for the sake of convenience.

FIG. 4A and FIG. 4B are shown on the basis of (not the horizontality and verticality of the tubular body imaging apparatus 100 but) verticality and horizontality with respect to the verticality and horizontality of the area camera 120. In each of the area cameras 120A and 120B, as schematically shown in FIG. 4A and FIG. 4B, a rectangular imaging object region (ROI) is set in each of an upper end portion and a lower end portion of the entire visual field of the area camera 120 so as to set, as the longitudinal direction, a direction in the entire visual field of the area camera 120 that is orthogonal to the tube axial direction of the tubular body 1 and is the direction in which the pixel information of the imaging element of the area camera 120 is transferred and so as not to include a portion of the entire visual field of the area camera 120 where annular laser light is blocked by the linking member 133.

Figure 4C:
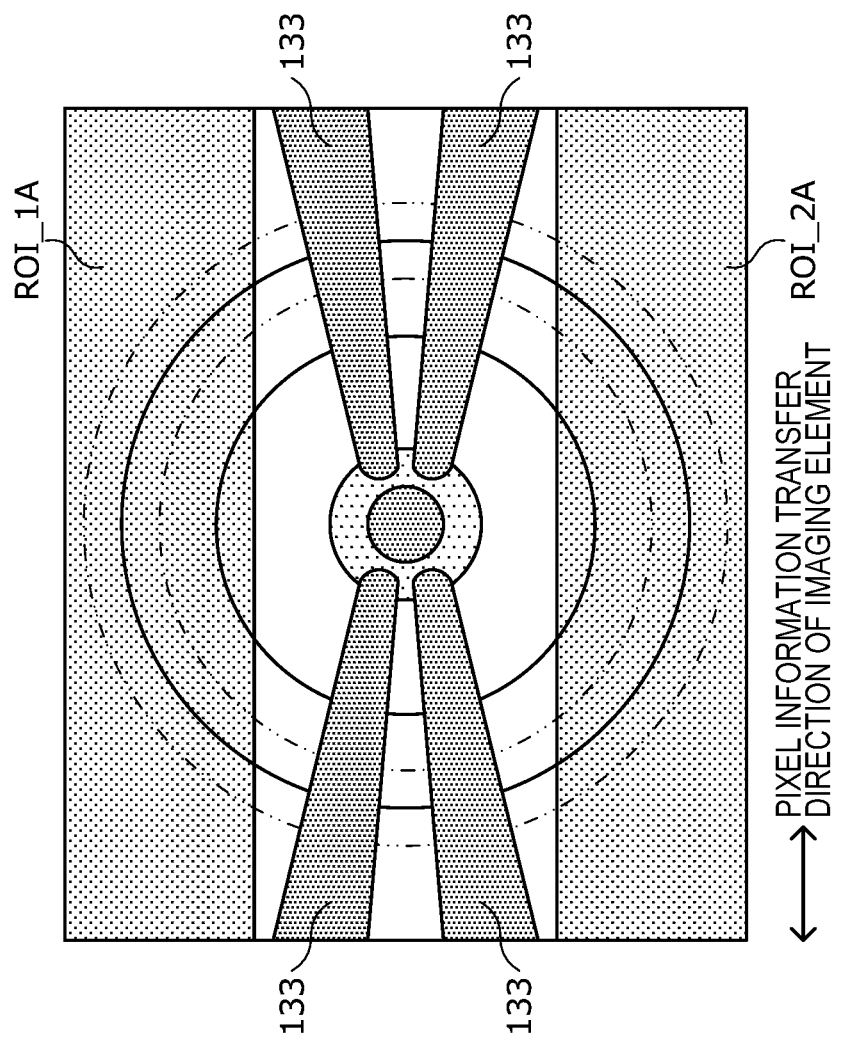
FIG. 4C is an explanatory diagram for describing a tubular body imaging apparatus according to the embodiment.

A plurality of linking members 133 are allowed to exist in a region other than the imaging object region (ROI) set in an upper end portion or a lower end portion of the entire visual field of the area camera 120, as schematically shown in FIG. 4C. Therefore, if a prescribed strength is required of the imaging unit 101 in order to prevent bending in the tube axial direction of the tubular body imaging apparatus 100, the arrangement of linking members 133 in the tubular body imaging apparatus 100 may be set such that a plurality of linking members 133 are located in a region other than these two imaging object regions (ROI), as appropriate.

The reason why imaging object regions (ROI) are set in an upper end portion and a lower end portion of the entire visual field of the area camera 120 is that it is aimed to enable the area camera 120 to extract one region of the image without a loss, in association with the transfer of pixel information regarding the charge or the voltage of each pixel of the imaging element in the horizontal direction. Hence, in the case where the area camera 120 is one that transfers pixel information regarding the charge or the voltage of each pixel of the imaging element in the vertical direction, imaging object regions (ROI) may be set in a left end portion and a right end portion of the entire visual field of the area camera 120.

In the area cameras 120A and 120B in the imaging units 101A and 101B, it is preferable that the size of the image related to each of the set two imaging object regions (ROI) in a direction orthogonal to the longitudinal direction of the imaging object region (ROI) be set such that a region mutually overlapping in a partial way exists.

A method for setting imaging object regions (ROI) in the present embodiment will now be described in detail with reference to FIG. 4A and FIG. 4B, with a focus on a tubular body imaging apparatus 100 having a structure like that shown in FIG. 2.

Here, in the example shown in FIG. 2, the imaging unit 101A and the imaging unit 101B are arranged such that the area cameras 120A and 120B are in a direction in which they face each other along the tube axial direction of the tubular body 1, and the imaging unit 101B is placed in a state of being rotated by 90 degrees from the imaging unit 101A in the counterclockwise direction in a plane orthogonal to the tube axial direction. Therefore, the image captured by the area camera 120A shown in FIG. 4A is shifted by 90 degrees from the image captured by the area camera 120B shown in FIG. 4B, and both images have a relationship of imaging the front and back sides in the tube axial direction.

As shown in FIG. 4A and FIG. 4B, the annular beam on the side nearer to the area camera 120A or 120B appears with a larger diameter in the imaging unit 101A or 101B, respectively. In the present embodiment, image processing like that described in detail below is performed by utilizing an annular beam that appears with a larger diameter. Hereinafter, the radius of an annular beam having a larger diameter is denoted by R. Further, an annular beam image located in the range of R±ΔR with the center at the position indicated by the radius R is used in image processing described below in detail. Therefore, the imaging object region (ROI) set in each of the area cameras 120A and 120B is preferably set so as to include at least an image region used in image processing in a later stage.

In the following, a case where the size of the imaging element mounted in the area cameras 120A and 120B is, for example, H (pixels in the vertical direction with respect to the area camera 120)=1200 pixels×W (pixels in the horizontal direction with respect to the area camera 120)=1920 pixels is used as an example. It is assumed that the position of the upper left corner in each of the imaging elements is the origin (0, 0) in a coordinate system showing the pixel position.

As mentioned above, rectangular imaging object regions (ROI) are set in the area cameras 120A and 120B according to the present embodiment. That is, the number of pixels in the imaging element horizontal direction of each of the imaging object regions (ROI) is W.

In the tubular body inner surface inspection apparatus 10 according to the present embodiment, an annular beam image of a portion falling under a region where annular laser light cannot be observed due to the linking member 133 is compensated for using each of annular beam images captured by both of the area cameras 120A and 120B as described below in detail. An annular beam image equivalent to the entire circumference of the inner surface of the tubular body 1 is ensured using annular beam images in four imaging object regions (ROI) as schematically show in FIG. 4A and FIG. 4B; hence, it is important that an annular beam image captured in one imaging object region (ROI) include at least the range of ±0=45 degrees with respect to the center of the annular beam (in other words, an annular beam with an arc length of more than or equal to ¼ of the entire circumference of the annular beam be included in one imaging object region (ROI)).

From this point of view, in the present embodiment, the imaging object region ROI_1A in the area camera 120A is set as a rectangular region of width W×height h from the pixel coordinates of (0, 0) with respect to the verticality and horizontality of the area camera 120A, and the number of pixels h in the imaging element vertical direction is prescribed by Formula (101) to Formula (103) below.

$$h = A + \Delta A \qquad \text{Formula (101)}$$

$$A = H/2 - R \cos \theta \qquad \text{Formula (103)}$$

$$\Delta A = \Delta R \cdot \cos \theta + \alpha \qquad \text{Formula (105)}$$

Here, as is clear from Formula (101) and Formula (103) above, the portion corresponding to the number of pixels A falls under a region including an annular beam of the range of ±0=45 degrees. Further, as is clear from Formula (101) and Formula (105) above, the portion corresponding to the number of pixels ΔA falls under a region that is set in order to ensure both of the size of an annular beam image used in image processing in a later stage and an imaging object region (ROI) mutually overlapping in a partial way between the two imaging units 101A and 101B. The parameter α in Formula (105) above is a permissible set value taking into account vibration and the like, and may be approximately five pixels, for example. The value of ΔR may be set in accordance with the inner diameter of the tubular body 1 that is the object to be inspected, the pixel size of the imaging element mounted in the area camera 120, etc., as appropriate; when the inner diameter of the tubular body is 400 mm and the pixel size of the imaging element is 0.4 mm×0.4 mm, the inner diameter of 400 mm corresponds to 1000 pixels, and accordingly ΔR may be set to approximately 25 pixels, for example.

Similarly, the imaging object region ROI_2A on the lower side in the area camera 120A is set as a rectangular region of width W×height h from (0, H−h) with respect to the verticality and horizontality of the area camera 120B, in a similar way to Formula (101) to Formula (105) above.

Also the imaging object region ROI_1B on the upper side and the imaging object region ROI_2B on the lower side in the area camera 120B are set similarly to those of the area camera 120A. Since the area camera 120B is obtained by rotating the area camera 120A only by 90 degrees in the counterclockwise direction, the set values on the camera may be the same as the area camera 120A.

In such an area camera in which imaging object regions (ROI) can be set, imaging can be performed while the imaging frame rate of the camera is increased in accordance with the ratio of the areas of the imaging object regions (ROI) to the entire imaging region of the camera. As a result, light-section lines based on laser light can be obtained with a finer period. That is, by setting the area of the imaging object region to ½, ⅓, ¼, etc. relative to the entire imaging region of the area camera, the amount of pixel information transferred in the imaging element is reduced to approximately ½, ⅓, ¼, etc. as compared to the case where an imaging object region (ROI) is not set; consequently, image capture in which the imaging frame rate is increased to approximately ½, ⅓, ¼, etc. is enabled. In the case where the period of captured image reading of the area camera is made to high speed, an image in which the resolving power in a direction (that is, in the present example, the vertical direction) orthogonal to the scanning direction is improved can be obtained. Therefore, in the tubular body imaging apparatus 100 according to the present embodiment, the inner surface of the tubular body can be imaged at higher speed, with higher resolving power, and in a simpler way.

In the present embodiment, the specific value of the imaging frame rate may be set in accordance with the required imaging rate etc., as appropriate; for example, the imaging frame rate of a total of two imaging object regions may be approximately 300 fps, which is a value of approximately twice a normal imaging frame rate (that is, the frame rate in the case where the entire imaging region of the area camera is imaged).

In an imaging element mounted in a common area camera, the frame rate does not improve even if the width of the imaging object region (ROI) in the direction in which the pixel information of the imaging element of the area camera 120 is transferred (in the case of FIG. 4A and FIG. 4B, the longitudinal direction of the captured image) is reduced; hence, as mentioned above, the width W of the imaging object region (ROI) may be the same as the width W in the direction in which the pixel information of the area camera 120 is transferred.

In the case where the width of the imaging object region (ROI) in a direction orthogonal to the direction in which the pixel information of the imaging element of the area camera 120 is transferred is reduced, it is expected that the frame rate will improve; in this case, the width w may be calculated by Formula (107) below in accordance with the height h mentioned above.

$$w = 2 \times (R \sin \theta + \Delta A) \quad \text{Formula (107)}$$

After that, a rectangular region of width w×height h from the coordinates of (W/2−R sin θ−ΔA, 0) may be set as the imaging object region ROI_1A on the upper side, and a rectangular region of width w×height h from the coordinates of (W/2−R sin−ΔA, H−h) may be set as the imaging object region ROI_2A.

It is preferable to create a situation where the set values of the imaging object regions ROI_1A, ROI_2A, ROI_1B, and ROI_2B in each of the area cameras 120A and 120B like that mentioned above can be set easily, by a method in which a look-up table or the like is created as preset values in advance in accordance with the size (the inner diameter or the like) of the tubular body 1 that is the object to be inspected, the look-up table or the like is stored in a storage section of the arithmetic processing apparatus 200 described later or the like, and the arithmetic processing apparatus 200 refers to the look-up table or the like when performing the imaging control of the area camera 120.

Figure 5A:
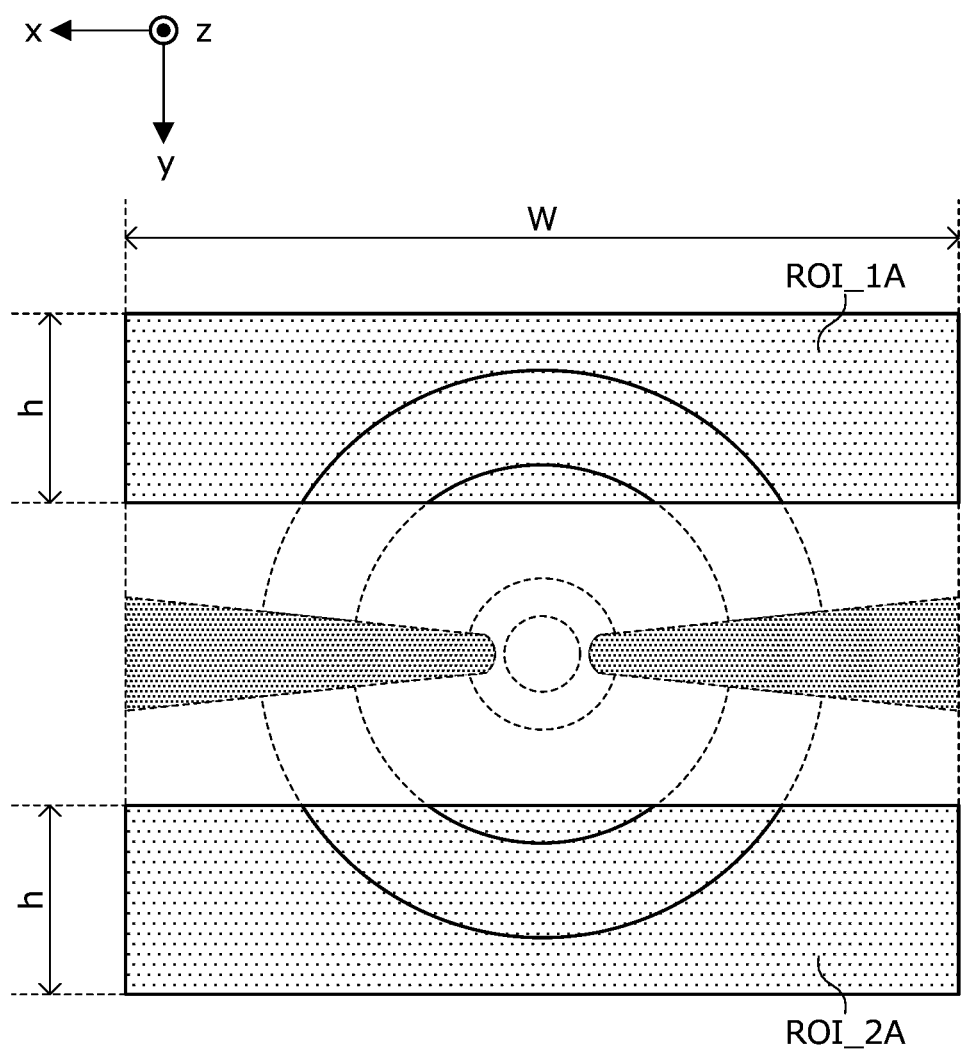
FIG. 5A is an explanatory diagram for describing a tubular body imaging apparatus according to the embodiment.
Figure 5B:
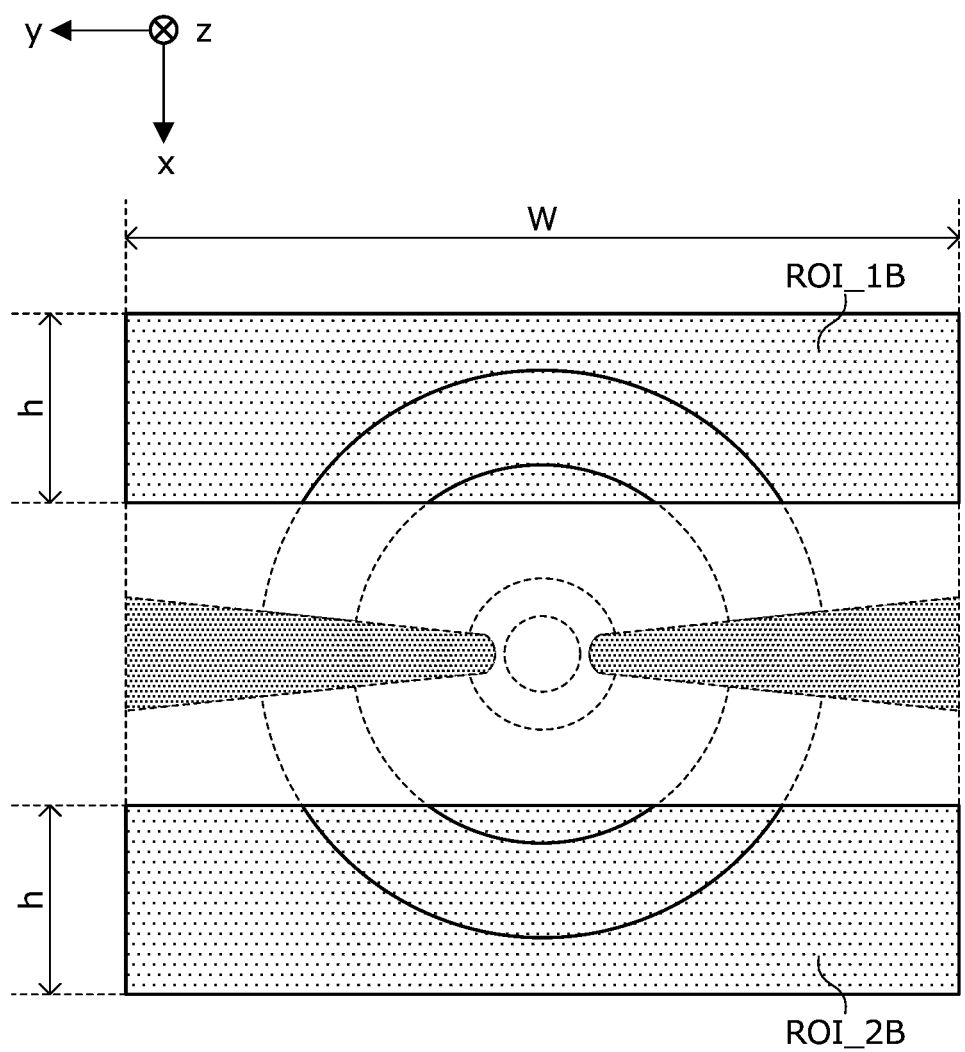
FIG. 5B is an explanatory diagram for describing a tubular body imaging apparatus according to the embodiment.

Annular beam images like those shown in FIG. 5A and FIG. 5B are generated by, for the area cameras 120A and 120B, setting two kinds of imaging object regions (ROI) in each area camera 120 and setting a total of four kinds of imaging object regions (ROI) in the two area cameras 120A and 120B.

For the apparatuses included in the tubular body imaging apparatus 100 according to the present embodiment, specific configurations, set values, etc. thereof will now be enumerated. These configurations, set values, etc. are only examples, and the tubular body imaging apparatus 100 according to the present invention is not limited to the following specific examples.

Tubular Body

Inner diameter: 100 mm to 500 mm, length: 10 m to 20 m

Illumination Mechanism 110

Laser light in the visible light region is applied with a power of 100 mW from the laser light source 111. The laser light becomes an annular beam of 50 mW by means of the optical element 113 in a conical shape (the cone angle: 90 degrees), and is reflected at the inner surface of the tubular body. The line beam width of the beam applied to the inner surface of the tubular body is 0.25 mm. The line beam width in this case is defined by 13.5% from the peak intensity value.

Area Camera 120

A CMOS device (pixel size: 4.8 μm×4.8 μm) of 1920 pixels widthwise×1200 pixels heightwise is mounted as the imaging element, and the frame rate is 150 fps. The focal distance of the lens is 1.81 mm, and the angle of view in the horizontal direction is 180°. The pixel size of the captured image is 0.4 mm×0.4 mm, and the line beam is photographed with a line beam width of a bright line of one to three pixels, on the captured image. When imaging object regions (ROI) are set so as to have a height equivalent to 600 pixels as two end regions in total in an upper end portion and a lower end portion of the CMOS device, the frame rate is 300 fps.

Area cameras 120A and 120B image the inner surface of the tubular body each time they advance 0.25 mm in the tube axial direction (that is, a PLG signal of one pulse is outputted each time the tubular body imaging apparatus 100 moves 0.25 mm).

<With Regard to Overall Configuration of Arithmetic Processing Apparatus 200>

Hereinabove, the configuration of the tubular body imaging apparatus 100 according to the present embodiment is described. Next, returning to FIG. 1 again, an overall configuration of the arithmetic processing apparatus 200 according to the present embodiment is described.

The arithmetic processing apparatus 200 according to the present embodiment mainly includes, for example as shown in FIG. 1, an imaging control section 201, an image processing section 203, a display control section 205, and a storage section 207.

The imaging control section 201 is composed of a central processing unit (CPU), a read-only memory (ROM), a random access memory (RAM), a communication device, etc. The imaging control section 201 controls the imaging of an object to be inspected performed by the tubular body imaging apparatus 100 according to the present embodiment. More specifically, when starting the imaging of the tubular body 1, the imaging control section 201 sends out, to the illumination mechanisms 110A and 110B, a control signal for causing the oscillation of laser light to start. Further, the imaging control section 201 sets, for each of the area cameras 120A and 120B, two kinds of imaging object regions (ROI) like those described above while referring to a look-up table or the like stored in the storage section 207 or the like described later, and then sends out a trigger signal for starting imaging to each of the area cameras 120A and 120B.

When the tubular body imaging apparatus 100 starts the imaging of the tubular body 1, a PLG signal is sent out from the tubular body imaging apparatus 100 on a periodic basis (for example, a PLG signal of one pulse is sent out each time the tubular body imaging apparatus 100 moves 0.25 mm), and the imaging control section 201 sends out a trigger signal for starting imaging to the area cameras 120A and 120B each time the imaging control section 201 acquires a PLG signal.

The image processing section 203 is composed of, for example, a CPU, a ROM, a RAM, a communication device, etc. The image processing section 203 generates a stripe image frame described later using imaging data acquired from the tubular body imaging apparatus 100 (more specifically, the area cameras 120A and 120B of the tubular body imaging apparatus 100). After that, the image processing section 203 performs image processing like that described below on the generated stripe image frame, and detects defects that can exist on the inner surface of the tubular body that is the object to be measured. On finishing the defect detection processing of the inner surface of the tubular body 1, the image processing section 203 sends information regarding the obtained detection result to the display control section 205.

The image processing section 203 will be described later in detail.

The display control section 205 is composed of, for example, a CPU, a ROM, a RAM, an output device, etc. The display control section 205 performs display control at the time of displaying a defect detection result of the tubular body 1 that is the object to be inspected, which result is sent from the image processing section 203, on an output device such as a display included in the arithmetic processing apparatus 200, an output device provided outside the arithmetic processing apparatus 200, etc. Thereby, the user of the tubular body inner surface inspection apparatus 10 can grasp a detection result regarding various defects existing on the inner surface of the object to be inspected (the tubular body 1) on the spot.

The storage section 207 is composed of, for example, a RAM, a storage device, etc. included in the arithmetic processing apparatus 200 according to the present embodiment. In the storage section 207, various parameters, reports on processing still in progress, etc. that need to be saved when the arithmetic processing apparatus 200 according to the present embodiment performs some kind of processing, such as setting preset values of imaging object regions (ROI) in the area cameras 120A and 120B of the tubular body imaging apparatus 100 according to the present embodiment, various databases and programs, etc. are recorded, as appropriate. The imaging control section 201, the image processing section 203, the display control section 205, etc. can execute read/write processing on the storage section 207.

[With Regard to Image Processing Section 203]

Figure 6:
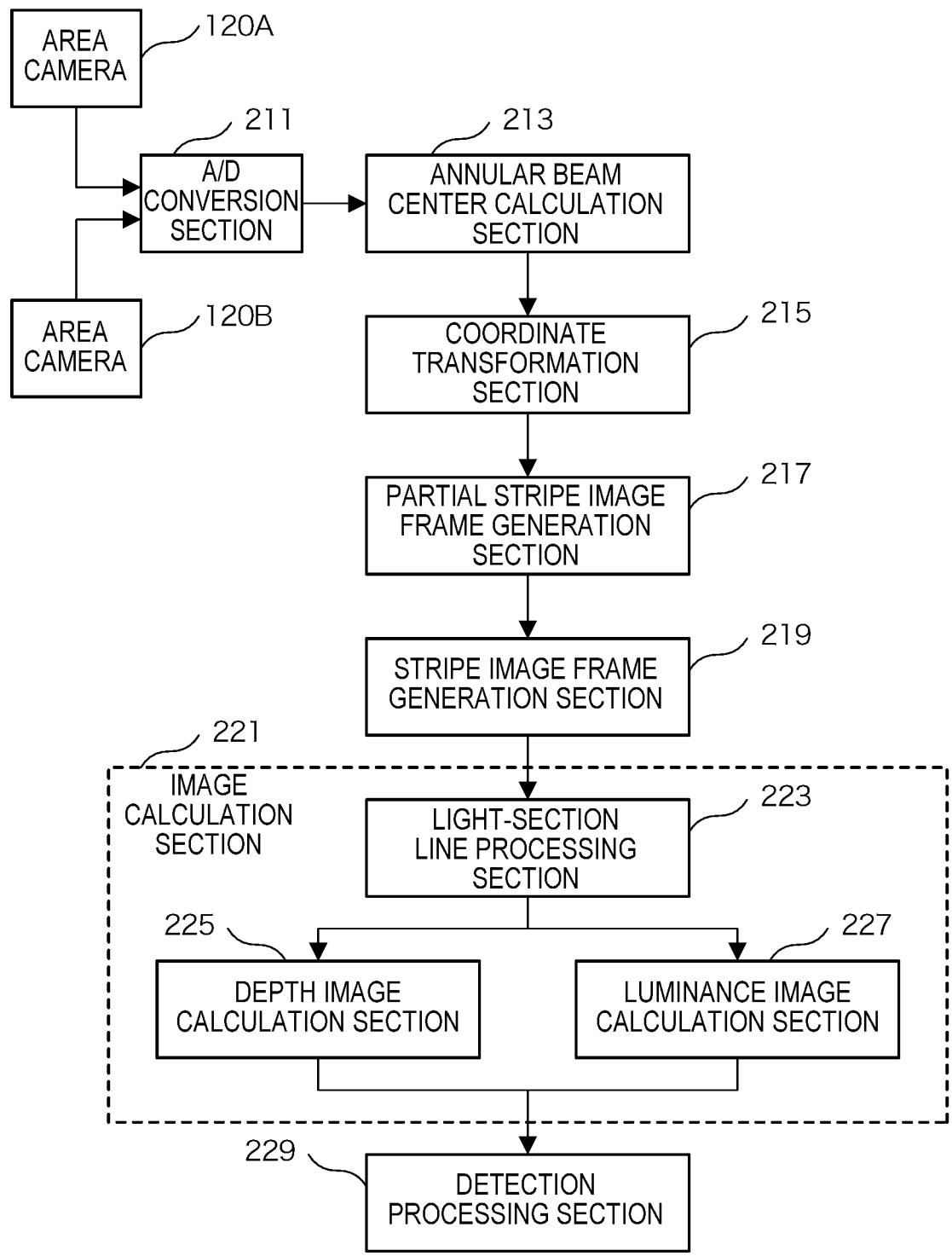
FIG. 6 is a block diagram showing an example of a configuration of an image processing section included in an arithmetic processing apparatus according to the embodiment.

Next, the image processing section 203 included in the arithmetic processing apparatus 200 according to the present embodiment is described in detail with reference to FIG. 6. FIG. 6 is a block diagram showing the configuration of the image processing section included in the arithmetic processing apparatus according to the present embodiment.

The image processing section 203 according to the present embodiment mainly includes, as shown in FIG. 6, an A/D conversion section 211, an annular beam center calculation section 213, a coordinate transformation section 215, a partial stripe image frame generation section 217, a stripe image frame generation section 219, an image calculation section 221, and a detection processing section 229.

The A/D conversion section 211 is composed of, for example, a CPU, a ROM, a RAM, etc. The A/D conversion section 211 A/D-converts captured images outputted from the area cameras 120A and 120B, and outputs the captured images as digital multiple-value image data (that is, annular beam images) regarding a total of four kinds of imaging object regions like those schematically shown in FIG. 5A and FIG. 5B. The digital multiple-value image data are stored in an image memory provided in the storage section 207 or the like. By sequentially using these digital multiple-value image data along the tube axial direction of the tubular body, partial stripe image frames and a stripe image frame like those described later are formed.

As schematically shown in FIG. 5A and FIG. 5B, an annular beam image is an image in which an annular beam applied to the inner surface of the tubular body is imaged in a position along the tube axial direction of the inner surface of the tubular body 1. The annular beam image can be made, for example, a light and shade image in which portions irradiated with the annular beam are displayed white and the other portions are displayed black, by appropriately setting the gain of the camera and the aperture of the lens in advance. Unevenness superimposed on the circumference of the annular beam includes information regarding a cross-sectional shape of the inner surface of the tubular body and defects existing on the inner surface.

On generating annular beam images on the basis of captured images outputted from each of the area cameras 120A and 120B, the A/D conversion section 211 outputs data corresponding to the generated annular beam images to the annular beam center calculation section 213 described later.

Although FIG. 6 illustrates a case where one A/D conversion section 211 A/D-converts captured images outputted from the area cameras 120A and 120B, two A/D conversion sections 211 may be provided, and a captured image outputted from each of the area cameras 120A and 120B may be A/D-converted by the corresponding dedicated A/D conversion section 211.

The annular beam center calculation section 213 is composed of, for example, a CPU, a ROM, a RAM, etc. The annular beam center calculation section 213 calculates the centroid position of the ring and the radius of the ring, using each of the annular beam images that are outputted from the A/D conversion section 211 and are generated by the two area cameras 120A and 120B.

Figure 7:
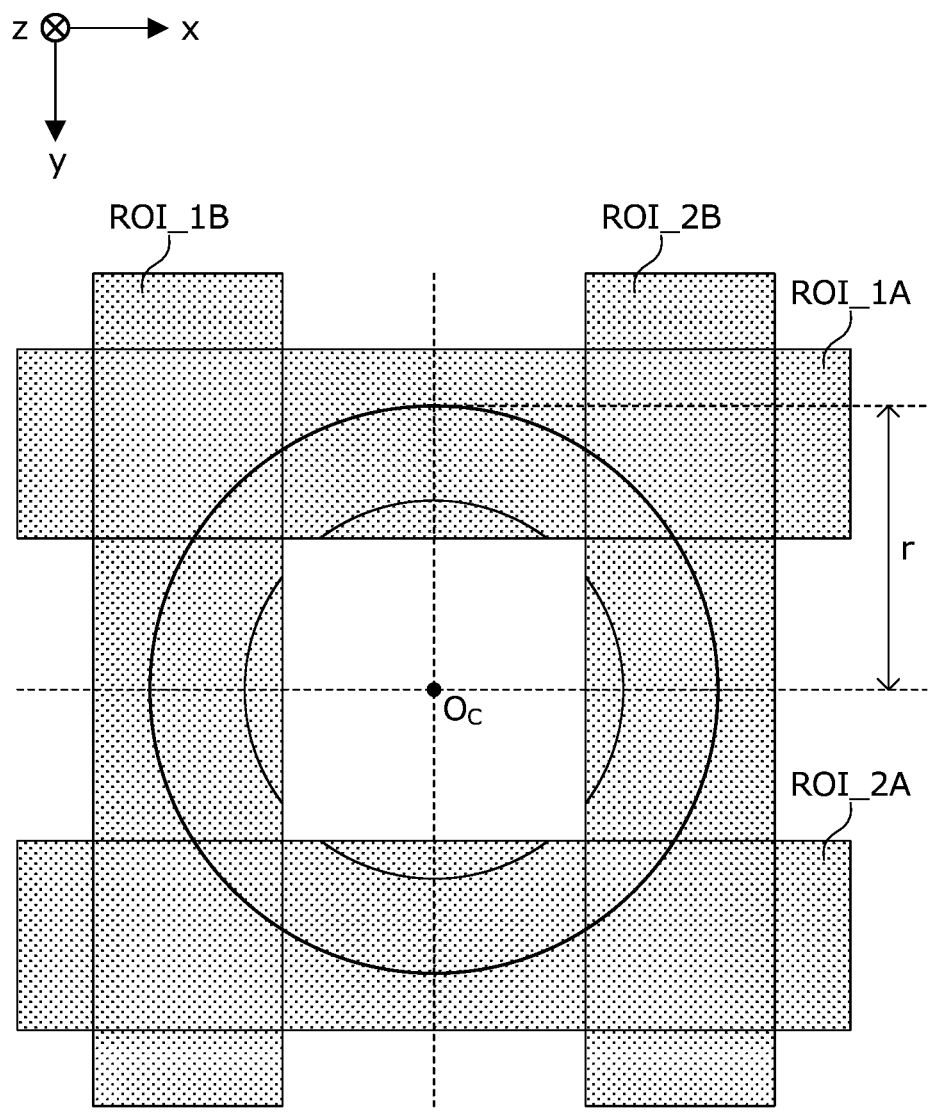
FIG. 7 is an explanatory diagram for describing processing of calculating a centroid position and a radius according to the embodiment.

At this time, it is preferable that, as schematically shown in FIG. 7, the annular beam center calculation section 213 generate a synthetic image like that shown in FIG. 7 using annular beam images generated by the area cameras 120A and 120B at the same timing, and calculate the centroid position $O_C$ of the ring and the radius r of the ring using the synthetic image. The synthetic image shown in FIG. 7 is an image in which annular beam images generated the area cameras 120A and 120B at the same imaging timing are combined such that the entire annular beam can be recognized.

Here, in what order to combine annular beam images in four kinds of imaging object regions (ROI) generated in the area cameras 120A and 120B may be set in advance from an optical positional relationship like that shown in FIG. 2 between the area cameras 120A and 120B. Further, in regard to in what positions to combine together annular beam images in four kinds of imaging object regions (ROI) generated in the area cameras 120A and 120B, combination positions whereby the annular beam images in four kinds of imaging object regions (ROI) are smoothly connected together may be specified in advance using a reference tube in which it has been found that a defect such as a flaw does not exist on the inner surface. Further, when combining annular beam images in four kinds of imaging object regions (ROI), the annular beam center calculation section 213 may finely adjust the combination positions of the annular beam images so that the annular beam images are smoothly connected together.

The method for calculating the centroid position $O_C$ and the radius r of the ring is not particularly limited, and all known methods may be used. In the case where the annular beam image is nearly a perfect circle, specific examples of the method for calculating the centroid position $O_C$ and the radius r of the ring include two methods like below.

Arbitrary three points on a binarized annular beam image are extracted, and the centroid of the position coordinates of the three points is calculated. The distance between the obtained centroid position and any one point among the three points is the radius of the ring.

Circle extraction based on the Hough transformation is performed, and the centroid and the radius of the circle (that is, the annular beam) are calculated.

On calculating the centroid position $O_C$ and the radius r of the ring for each annular beam image, the annular beam center calculation section 213 generates information regarding the centroid position $O_C$ and the radius r of the ring, and outputs the information to the coordinate transformation section 215 described later.

Although in the present embodiment a case where the cross-sectional shape of the inner surface of the tubular body 1 is nearly a perfect circle is described, the present invention can be applied to an arbitrary cross-sectional shape, and the cross-sectional shape may be an ellipse, a round-cornered rectangle, or the like, for example. The centroid in such a case can be found from the shape of the annular beam, and the average value of the maximum value and the minimum value of the distance to the found centroid may be used as the radius; thereby, a coordinate transformation described later can be performed by the same procedure.

Further, although in the above a case where the centroid position $O_C$ and the radius r of the ring are calculated after a synthetic image is generated is described, the annular beam center calculation section 213 may, without generating a synthetic image like that shown in FIG. 7, use annular beam images obtained from the area camera 120A to calculate the centroid position $O_C$ and the radius r of the ring, and use annular beam images obtained from the area camera 120B to calculate the centroid position $O_C$ and the radius r of the ring. In this case, in a coordinate transformation processing described later, the centroid position $O_C$ and the radius r of the ring calculated from annular beam images in the time of sending-in are used for the annular beam images obtained from the area camera 120A, and the centroid position $O_C$ and the radius r of the ring calculated from annular beam images in the time of sending-out are used for the annular beam images obtained from the area camera 120B. However, two kinds of centroid positions $O_C$ and two kinds of radii r of the ring are used; therefore, when sequentially combining all the partial stripe image frames in the processing of generating a stripe image frame described later, attention needs to be paid to how to connect partial stripe image frames; thus, processing in a later stage may be complicated.

The coordinate transformation section 215 is composed of, for example, a CPU, a ROM, a RAM, etc. The coordinate transformation section 215 performs a polar coordinate transformation on the coordinate system of an annular beam image on the basis of the calculated centroid position and the calculated separation distance (the amount of separation) between the centroid position and the irradiation portion of the annular beam. Thus, the image of the irradiation portion of annular laser light appearing in a curved line shape in the annular beam image is transformed to a line segment in a straight line shape by the polar coordinate transformation. After that, the coordinate transformation section 215 generates a light-section image expressed as a line segment corresponding to the irradiation portion of the annular beam.

That is, by the centroid position of the annular beam being calculated, the orthogonal coordinate system on the xy plane can be transformed to a polar coordinate system, and the existence position of a pixel corresponding to an irradiation position of the annular beam can be expressed by polar coordinates $(r, \theta)$ with the centroid position as the origin. As shown in FIG. 8, the coordinate transformation section 215 provides a margin of $\pm\Delta r$ in the radius vector direction to the radius r calculated in the annular beam center calculation section 213 (that is, in the range of $r-\Delta r$ to $r+\Delta r$), and then performs a coordinate transformation in the range of $-\theta$ to $\theta$ shown in FIG. 4A and FIG. 4B (in the case of FIG. 4A and FIG. 4B, the range of $-45°\leq\theta\leq45°$). Although in the present embodiment a case where a coordinate transformation is performed in the range of $r-\Delta r$ to $r+\Delta r$ in the radius vector direction is described, the value of the margin $\Delta r$ may be different between the plus direction and the minus direction to the extent that it includes the irradiation portion of the annular beam. In this case, for example, the range in which a coordinate transformation is performed can be expressed as $r-\Delta_1$ to $r+\Delta r_2$, or the like. However, in the present embodiment, the following description is given for a case where the same value $\Delta r$ is used for the plus direction and the minus direction.

By performing such a coordinate transformation, as shown in the right side of FIG. 8, a band-shaped image that has a height of $2\Delta r$ with the radius r as the center in the radius vector direction and has a length corresponding to $\theta$ to $\theta'$ (in the case of FIG. 4A and FIG. 4B, approximately 90 degrees) in the angle direction is extracted. As is clear from the above description, the extracted band-shaped image is caused to include a line segment (hereinafter, occasionally referred to as a "light-section line") in which the irradiation portion of the annular beam is developed in the tube circumferential direction of the tubular body. By extracting the range of $2\Delta r$ with the radius r as the center in the radius vector direction, even if unevenness exists on the circumference of the annular beam, the entire circumference of the annular beam including the unevenness can be extracted. The band-shaped image obtained in this way is hereinafter referred to as a light-section image.

The magnitude of $\Delta r$ can be set by roughly calculating the range of the height of unevenness that can exist on the tubular body 1 in advance, on the basis of past operation data etc.

In the case where a tubular body imaging apparatus 100 having a specific configuration like that described above is used, an annular beam image captured by the tubular body imaging apparatus 100 is caused to include a ring having a radius equivalent to approximately 400 pixels. Thus, when r and $\Delta r$ are set to r=400 pixels and $\Delta r$=25 pixels, and a light-section image is extracted in the range of $-45°\leq\theta\leq45°$, a light-section image of 628 pixels horizontally×50 pixels heightwise is generated.

Since the coordinate transformation section 215 performs a transformation from an orthogonal coordinate system to a polar coordinate system, a lattice point (that is, the center position of a pixel) in the orthogonal coordinate system does not necessarily correspond to a lattice point in the polar coordinate system, and there are points corresponding to non-lattice points. Thus, in order to interpolate the concentration (pixel value) of a non-lattice point in the polar coordinate system, the coordinate transformation section 215 preferably performs also what is called an image interpolation method, which performs an interpolation on the basis of the concentration of other lattice points located in the neighborhood of the point focused on.

The image interpolation method is not particularly limited; for example, known image interpolation methods described in "*Gazo-shori Handobukku* (Image processing Handbook), Shokodo Co., Ltd.," etc. may be used. Examples of such an image interpolation method include the nearest neighbor method, the bi-linear interpolation method, the bi-cubic convolution method, and the like. Among these methods, a former method yields a higher processing speed, and a latter method yields a result of a higher quality. Thus, the coordinate transformation section 215 may set the class of the image interpolation method used in accordance with the amount of resources, the processing time, etc. that can be used for the processing, as appropriate. In the specific example of the light-section image shown in the present embodiment, the bi-cubic convolution method is used as the image interpolation method.

On finishing coordinate transformation processing and image interpolation processing like those described above, the coordinate transformation section 215 sequentially stores image data corresponding to the obtained light-section images in the image memory provided in the storage section 207 or the like, along the tube axial direction of the tubular body.

The partial stripe image frame generation section 217 is composed of, for example, a CPU, a ROM, a RAM, etc. The partial stripe image frame generation section 217 sequentially acquires, from the image memory provided in the storage section 207 or the like, light-section images regarding imaging object regions (that is, ROI_1A, ROI_2A, ROI_1B, and ROI_2B) stored along the tube axial direction of the tubular body. After that, the partial stripe image frame generation section 217 sequentially arranges the acquired light-section images regarding imaging object regions along the tube axial direction of the tubular body, and generates four kinds of partial stripe image frames individually for the imaging object regions.

The number of light-section images constituting one partial stripe image frame may be set as appropriate; for example, one partial stripe image frame may be composed of 512 light-section images. The light-section images exist at intervals of the imaging of annular beam images (for example, at intervals of 0.25 mm), as described above. Hence, one partial stripe image frame composed of 512 light-section images that are based on annular beam images captured at intervals of 0.25 mm corresponds to a result obtained by imaging one quarter of the entire circumference of the inner surface of the tubular body in a range of 128 mm (=512×0.25 mm) along the tube axial direction.

FIG. 9 shows an example of a partial stripe image frame generated by the partial stripe image frame generation section 217. FIG. 9 schematically shows a case where a partial stripe image frame regarding the imaging object region ROI_1A is generated using light-section images regarding the imaging object region ROI_1A. In the partial stripe image frame schematically shown in FIG. 9, one line segment extending in the horizontal direction of the drawing is equivalent to an image in which one annular beam image is developed, and the horizontal direction of the drawing corresponds to the tube circumferential direction of the annular beam. Further, in the partial stripe image frame shown in FIG. 9, the vertical direction of the drawing corresponds to the tube axial direction of the tubular body 1.

On generating four kinds of partial stripe image frames regarding ROI_1A to ROI_2B in the above way, the partial stripe image frame generation section 217 outputs the generated partial stripe image frames to the stripe image frame generation section 219 described later. Further, the partial stripe image frame generation section 217 may associate, with data corresponding to the generated partial stripe image frame, time information regarding the date and time at which the partial stripe image frame is generated and regarding other matters, and may store these pieces of information as history information in the storage section 207 or the like.

The stripe image frame generation section 219 is composed of, for example, a CPU, a ROM, a RAM, etc. The stripe image frame generation section 219 combines four kinds of partial stripe image frames generated by the partial stripe image frame generation section 217 with each other while taking into account the optical positional relationship between the two illumination mechanisms 110A and 110B, and generates a stripe image frame in which light-section lines extending throughout the entire circumference of the inner surface of the tubular body 1 are sequentially arranged along the tube axial direction of the tubular body.

As schematically shown in FIG. 2, the irradiation position of the annular beam applied from the imaging unit 101A and the irradiation position of the annular beam applied from the imaging unit 101B are separate from each other by the offset D. In the case where the offset D is equivalent to D' lines in a partial stripe image frame, an annular beam image that is captured by the area camera 120A in some position in the tube axial direction is supposed to be captured by the area camera 120B with a delay equivalent to D' lines. Therefore, as schematically shown in FIG. 10, the stripe image frame generation section 219 causes the light-section image of the 1st line captured by the area camera 120A and the light-section image of the (D'+1)-th line captured by the area camera 120B to coincide, taking into account the optical positional relationship between the two area cameras 120A and 120B, and then combines four kinds of partial stripe image frames with each other while taking into account an overlapping portion between partial stripe image frames; and thus generates a stripe image frame.

On generating a stripe image frame like that shown in FIG. 10, the stripe image frame generation section 219 outputs the generated stripe image frame to the image calculation section 221 described later. Further, the stripe image frame generation section 219 may associate, with data corresponding to the generated stripe image frame, time information regarding the date and time at which the stripe image frame is generated and regarding other matters, and may store these pieces of information as history information in the storage section 207 or the like.

In the above description, attention is focused on a case where light-section images are generated in each of the imaging units 101A and 101B, the generated light-section images are individually arranged in a sequential manner along the tube axial direction to generate partial stripe image frames, and the partial stripe image frames are adjusted on the basis of the positional relationship between the imaging units 101A and 101B and are then connected in planes orthogonal to the tube axis; thereby, a stripe image frame is generated. However, the present invention is not limited to this case; for example, a stripe image frame may be generated also by generating light-section images in each of the imaging units 101A and 101B, adjusting the generated light-section images on the basis of the positional relationship between the imaging units 101A and 101B, connecting the light-section images in planes orthogonal to the tube axis, and then sequentially arranging the connected light-section images along the tube axial direction.

The image calculation section 221 is composed of, for example, a CPU, a ROM, a RAM, etc. On the basis of the stripe image frame generated by the stripe image frame generation section 219, the image calculation section 221 calculates a depth image showing the unevenness condition of the inner surface of the tubular body and a luminance image showing the distribution of luminances of the annular beam on the inner surface of the tubular body. The image calculation section 221 includes, as shown in FIG. 6, a light-section line processing section 223, a depth image calculation section 225, and a luminance image calculation section 227.

Figure 11B:
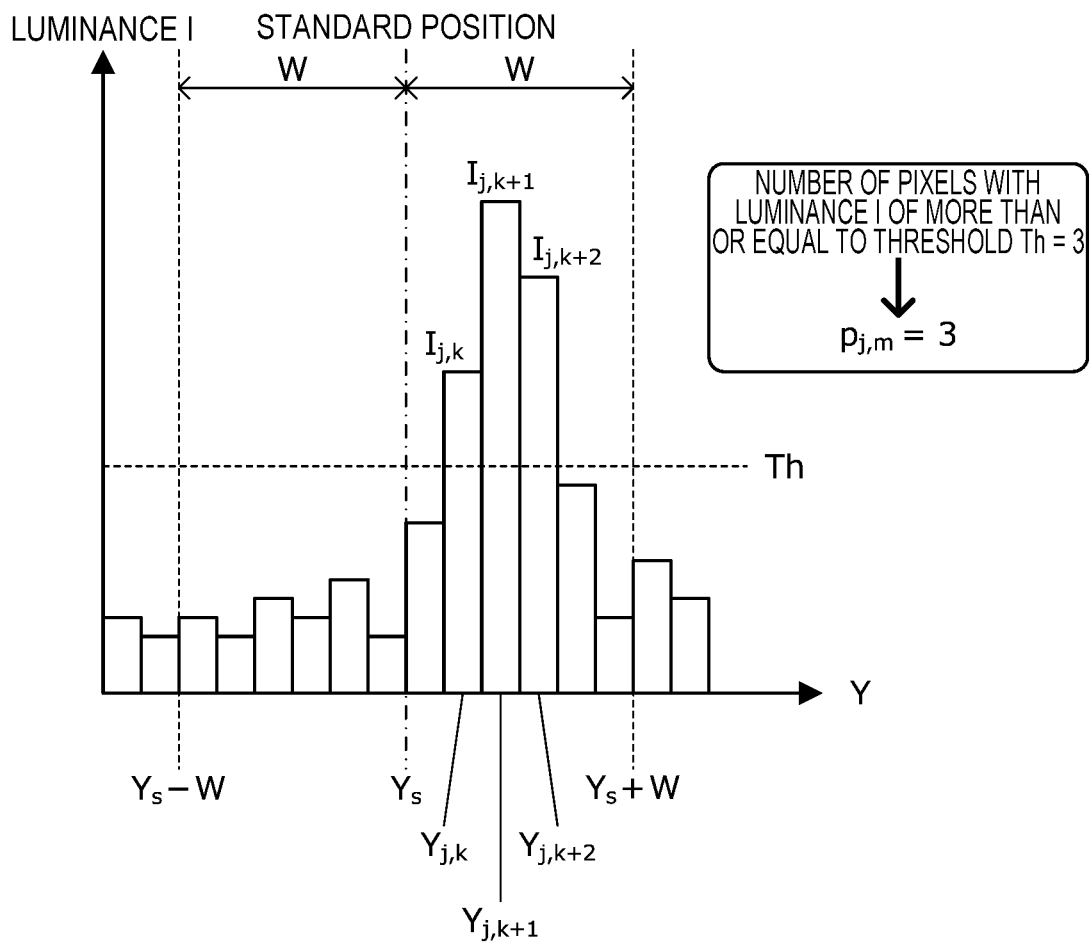
FIG. 11B is an explanatory diagram for describing light-section line processing according to the embodiment.

The light-section line processing section 223 is composed of, for example, a CPU, a ROM, a RAM, etc. For each light-section line included in a stripe image frame, the light-section line processing section 223 calculates light-section line feature values including the amount of displacement of the light-section line (the bending manner of the bright line). Processing performed by and light-section line feature values calculated by the light-section line processing section 223 will now be described in detail with reference to FIG. 11A and FIG. 11B. FIG. 11A is an explanatory diagram schematically showing a stripe image frame. FIG. 11B is an explanatory diagram for describing light-section line processing performed by the light-section line processing section.

In FIG. 11A, it is assumed that N light-section lines exist in one stripe image frame, and the length in the horizontal direction of the stripe image frame is M pixels. Further, one light-section image including one light-section line is composed of $2\Delta r$ pixels vertically×M pixels horizontally.

Here, for convenience of description, the position of the pixel in the stripe image frame is expressed by XY coordinates, with an X-axis set in the tube circumferential direction of the stripe image frame (the horizontal direction in FIG. 11A) and a Y-axis set in the tube axial direction of the stripe image frame (the vertical direction in FIG. 11A). In the following description, attention is focused on the position (that is, the position expressed by $X_{j,m}$) of the m-th pixel ($1 \le m \le M$) from the left side of the j-th light-section line ($1 \le j \le N$) existing in the stripe image frame.

The light-section line processing section 223 first selects the X-coordinate position to be focused on (in the present description, the position expressed by $X_{j,m}$) of the light-section line to be focused on (hereinafter, occasionally referred to as simply a "line"), and then as shown in FIG. 11B refers to a distribution of pixel values (that is, luminance values of the annular beam) associated with the pixel in the focused-on X-coordinate position of the focused-on line. At this time, the light-section line processing section 223 does not perform processing described below on all the pixels in that X-coordinate position in the light-section image, but performs processing described below on the pixels in the range of W before and after a standard position $Y_s$ of the Y-coordinate in the light-section image (that is, the pixels in the range of $Y_s$–W to $Y_s$+W).

Here, the standard position $Y_s$ of the Y-coordinate is a position in the tube axial direction that is designated to the light-section image of the j-th line of the stripe image frame in advance; for example, in the case where the same margin value $\Delta r$ is used for the plus direction and the minus direction as described above, when the center in the tube axial direction of the light-section image is designated, the standard position $Y_s$ is equal to the radius r (that is, the position of the light-section line) calculated by the annular beam center calculation section. The parameter W prescribing the processing range may be set by roughly calculating the range of the height of unevenness that can exist on the tubular body 1 in advance on the basis of past operation data etc., in such a manner that the range of W before and after the standard position $Y_s$ of the Y-coordinate in the light-section image comes within the light-section image, as appropriate. When the value of the parameter W is able to be reduced, the processing load on the light-section line processing section 223 described later can be reduced.

The light-section line processing section 223 first specifies, from among the pixels included in the range of $Y_s$–W to $Y_s$+W, pixels having a pixel value of more than or equal to a prescribed threshold Th that is an example of a first threshold for specifying pixels corresponding to the light-section line. In the example shown in FIG. 11B, three pixels indicated by $Y_{j,k}$, $Y_{j,k+1}$, and $Y_{j,k+2}$ have pixel values $I_{j,k}$, $I_{j,k+1}$, and $I_{j,k+2}$ more than or equal to the threshold Th, respectively. Thus, the light-section line processing section 223 sets a figure $p_{j,m}$ obtained by adding, in the line width direction, pixels having a pixel value of more than or equal to the prescribed threshold Th to $p_{j,m}=3$. The figure $p_{j,m}$ obtained by adding, in the line width direction, pixels having a pixel value of more than or equal to the prescribed threshold Th is, so to speak, a value corresponding to the number of pixels of the bright line in the position (j, m), and is a light-section line feature value. In the following processing, the light-section line processing section 223 calculates other light-section line feature values one after another using information regarding the extracted pixels $(Y_{j,k}, I_{j,k})$, $(Y_{j,k+1}, I_{j,k+1})$, and $(Y_{j,k+2}, I_{j,k+2})$ (hereinafter, occasionally abbreviated as simply (Y, I)).

Further, the light-section line processing section 223 calculates the sum total $K_{j,m}$ of the luminances of the extracted pixels using the parameter $p_{j,m}$ and information (Y, I) regarding the extracted pixels. In the case of the example shown in FIG. 11B, the sum total of luminances calculated by the light-section line processing section 223 is $K_{j,m}=I_{j,k}+I_{j,k+1}+I_{j,k+2}$. Also the sum total of luminances $K_{j,m}$ is a light-section line feature value.

Further, the light-section line processing section 223 uses information (Y, I) regarding the extracted pixels and the standard position $Y_s$ of the Y-coordinate to calculate the centroid position $Y_C(j, m)$ in the Y direction of the extracted pixels, and calculates the amount of displacement from the standard position $Y_s$ of the centroid position $Y_C(j, m)$, $\Delta d_{j,m}=Y_s-Y_C(j, m)$.

Here, when a set of extracted pixels is represented by A, the centroid position $Y_C(j, m)$ is the value represented by Formula 111 below. Therefore, in the case of the example shown in FIG. 11B, the centroid position $Y_C(j, m)$ is the value represented by Formula 111a below.

[Math. 1]

$$Y_C(j, m) = \frac{\sum_{q \in A} Y_q \cdot I_q}{\sum_{q \in A} I_q} \quad \text{(Formula 111)}$$

$$Y_C(j, m) = \frac{Y_{j,k} \cdot I_{j,k} + Y_{j,k+1} \cdot I_{j,k+1} + Y_{j,k+2} \cdot I_{j,k+2}}{I_{j,k} + I_{j,k+1} + I_{j,k+2}} \quad \text{(Formula 111a)}$$

Here, the position in the tube axial direction corresponding to a pixel is, so to speak, a value quantized by the movement range (for example, 0.25 mm) of the tubular body imaging apparatus 100. On the other hand, the centroid position $Y_C(j, m)$ calculated by an operation like that shown in Formula 111 above is a value calculated by using a mathematical operation of division, and hence can be a value smaller than the movement range (so to speak, a quantization unit) of the tubular body imaging apparatus 100. Therefore, also the amount of displacement $\Delta d_{j,m}$ calculated by using the centroid position $Y_C(j, m)$ is a value that can have a value smaller than the movement range. Also the amount of displacement $\Delta d_{j,m}$ calculated in this way is a light-section line feature value.

Figure 12A:
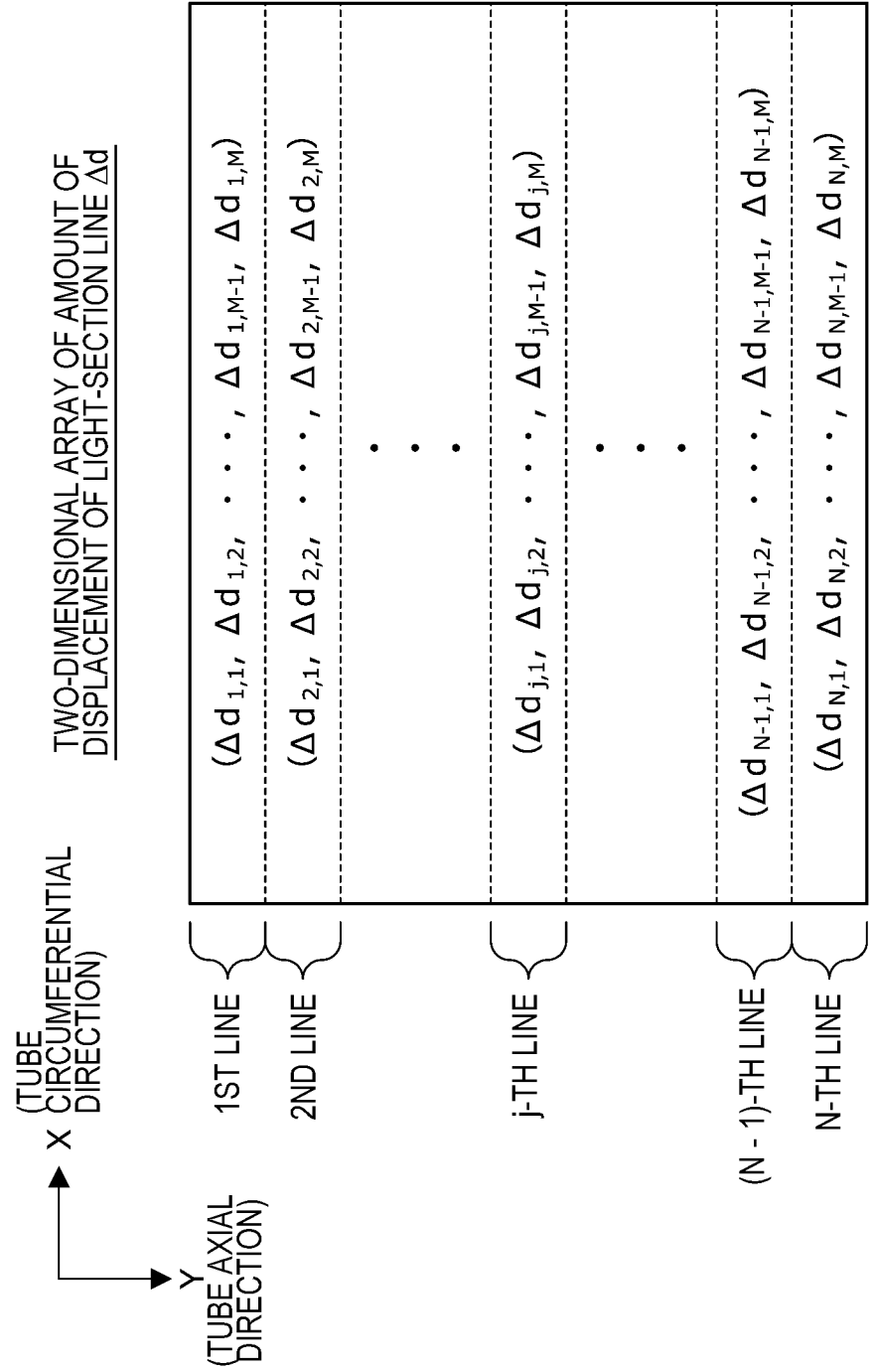
FIG. 12A is an explanatory diagram showing a two-dimensional array of light-section line displacements according to the embodiment.

The light-section line processing section 223 calculates three kinds of feature values like the above for M elements included in each section line. As a result, as shown in FIG. 12A to FIG. 12C, two-dimensional arrays of M columns×N rows are generated for the amount of displacement of the light-section line $\Delta d$, the sum total of luminances K, and the number of pixels of the bright line p. In the case of the specific example of the stripe image frame according to the present embodiment, M=1920, and N=512; thus, the number of data constituting each light-section line feature value is 1920×512.

The light-section line processing section 223 outputs, among the calculated light-section line feature values, the feature value regarding the amount of displacement of the light-section line $\Delta d$ to the depth image calculation section 225 described later. Further, the light-section line processing section 223 outputs, among the calculated light-section line feature values, the feature values regarding the sum total of luminances K and the number of pixels of the bright line p to the luminance image calculation section 227 described later.

The depth image calculation section 225 is composed of, for example, a CPU, a ROM, a RAM, etc. The depth image calculation section 225 calculate a depth image showing the unevenness condition of the inner surface of the tubular body on the basis of a light-section line feature value (in particular, the feature value regarding the amount of displacement $\Delta d$) generated by the light-section line processing section 223.

Specifically, the depth image calculation section 225 calculates a depth image using a feature value (a two-dimensional array) regarding the amount of displacement $\Delta d$ like that shown in FIG. 12A and the incidence angle of the perpendicular component of the annular beam (angle $\varphi_1=\varphi_2=\varphi$ in FIG. 2). The depth image is an image showing a two-dimensional distribution of the unevenness condition in which one-dimensional distributions of the unevenness condition in positions in the tube axial direction are sequentially arranged along the tube axial direction.

Figure 13:
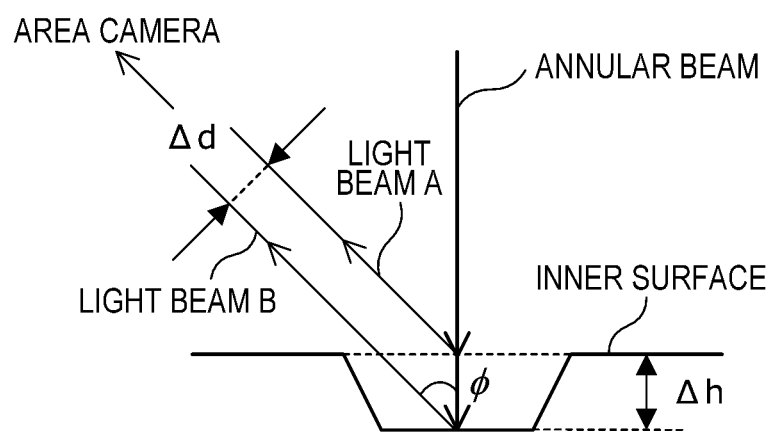
FIG. 13 is an explanatory diagram showing a relationship between a displacement of a light-section line and a height of a defect.

First, a relationship between the height of unevenness existing on the inner surface of the tubular body and the amount of displacement of the light-section line $\Delta d$ is described with reference to FIG. 13. FIG. 13 is an explanatory diagram showing a relationship between the displacement of the light-section line and the height of a defect.

FIG. 13 schematically shows a case where a concavity exists on the inner surface of the tubular body 1. Here, the difference between the height of the surface position in the case where the concavity does not exist on the inner surface and the height of the bottom of the concavity is denoted by $\Delta h$. When attention is focused on a case where a perpendicularly incident annular beam is reflected at the surface, the reflected light propagates as shown by light beam A of FIG. 13 in the case where the concavity does not exist on the inner surface; on the other hand, in the case where the concavity exists on the inner surface, the reflected light propagates as shown by light beam B of FIG. 13. The gap between light beam A and light beam B is observed as the amount of displacement of the light-section line $\Delta d$ in the present embodiment. Here, as is clear from a geometric positional relationship, the relation of $\Delta d = \Delta h \cdot \sin \varphi$ holds between the amount of displacement of the light-section line $\Delta d$ and the depth of the concavity $\Delta h$.

Although in FIG. 13 a case where a concavity exists on the inner surface of the tubular body is described, a similar relation holds also in the case where a convexity exists on the inner surface of the tubular body.

The depth image calculation section 225 calculates an amount regarding unevenness $\Delta h$ of the inner surface of the tubular body using a relationship like that described above, on the basis of the feature value regarding the amount of displacement of the light-section line $\Delta d$ calculated by the light-section line processing section 223.

Here, the amount of displacement of the light-section line $\Delta d$ used for the calculation of a depth image is one calculated on the basis of the centroid position of the light-section line as described above, and is a value that can have a value smaller than the movement range. Therefore, the depth image calculated by the depth image calculation section 225 is an image in which unevenness is reproduced with a resolving power finer than the pixel size of the imaging element.

The specific example of the stripe image frame shown in the present embodiment is the cumulative value of displacements of the light-section line imaged with a photographing pitch of 0.25 mm; thus, when each amount of displacement $\Delta d$ is converted to $\Delta h$, a depth image of a width of 0.25 mm×a height of 0.25 mm is calculated. Further, in this specific example, since the angle $\varphi=45°$, the relation of $\Delta d=(1/2^{0.5}) \cdot \Delta h$ holds.

Figure 14:
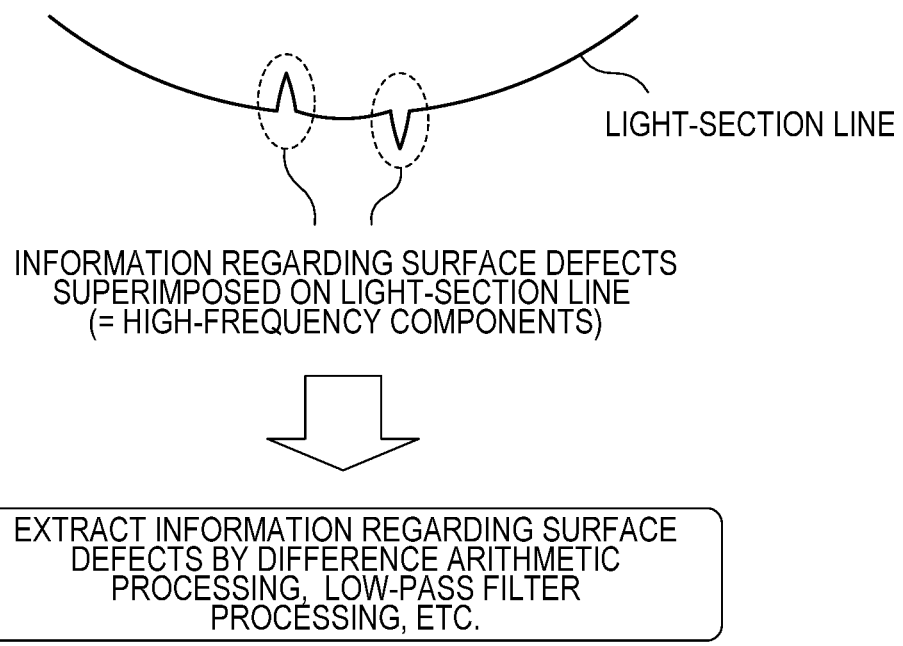
FIG. 14 is an explanatory diagram for describing approximate correction processing of a light-section line according to the embodiment.

There is a case where, as shown in FIG. 14, a warp such as a curve occurs in the light-section line because of a change in the shape of the inner surface of the tubular body that is the body to be inspected or a shift in the camera scanning direction axis from the center of the tubular body. On the other hand, in the tubular body inner surface inspection method according to the present embodiment, unevenness superimposed on the light-section line serves as information regarding the cross-sectional shape of the inner surface of the tubular body and surface defects existing on the inner surface. Hence, when calculating a depth image on the basis of the amount of displacement of the light-section line $\Delta d$, the depth image calculation section 225 may perform warp correction processing on each light-section line and extract only information regarding unevenness superimposed on the light-section line. By performing such warp correction processing, information of unevenness flaws existing on the inner surface can be exclusively obtained even when the camera scanning direction axis does not accurately coincide with the center axis of the tubular body or even when the shape of the inner surface is not a circle.

Specific examples of the warp correction processing include (i) processing that performs fitting processing using a multidimensional function or various nonlinear functions and performs a difference operation between the obtained fitting curve and the observed light-section line, (ii) processing that uses a low-pass filter such as a floating filter or a median filter by utilizing the fact that information regarding unevenness is high-frequency components, etc. By performing such warp correction processing, the light-section line can be flattened while information of unevenness flaws existing on the inner surface is held.

The depth image calculation section 225 outputs information regarding a depth image calculated in the manner described above to the detection processing section 229 described later.

The luminance image calculation section 227 is composed of, for example, a CPU, a ROM, a RAM, etc. The luminance image calculation section 227 calculates a luminance image showing the distribution of luminances of the annular beam on the inner surface of the tubular body on the basis of light-section line feature values generated by the light-section line processing section 223 (in particular, the feature values regarding the sum total of luminances K and the number of pixels of the bright line p).

Specifically, the luminance image calculation section 227 calculates the average luminance $K_{AVE}(j, m)=K_{j,m}/p_{j,m}$ ($1 \leq j \leq N$, $1 \leq m \leq M$) that is the average value in the line width direction of the sum total of luminances, using a feature value (a two-dimensional array) regarding the sum total of luminances K like that shown in FIG. 12B and a feature value (a two-dimensional array) regarding the number of pixels of the bright line p like that shown in FIG. 12C. After that, the luminance image calculation section 227 takes a data array composed of the calculated average luminances $K_{AVE}(j, m)$ as a luminance image of the tubular body focused on. The luminance image is an image showing a two-dimensional luminance distribution in which one-dimensional distributions of the luminance of annular laser light in positions in the tube axial direction are sequentially arranged along the tube axial direction.

The luminance image calculation section 227 outputs information regarding a luminance image calculated in the manner described above to the detection processing section 229 described later.

The detection processing section 229 is composed of, for example, a CPU, a ROM, a RAM, etc. The detection processing section 229 detects defects existing on the inner surface of the tubular body on the basis of a depth image calculated by the depth image calculation section 225 and a luminance image calculated by the luminance image calculation section 227.

The detection processing section 229 has a defect part identification function of identifying defect parts on the basis of a depth image and a luminance image, a feature value extraction function of extracting feature values regarding the form and the pixel values of the identified defect part, and a defect discrimination function of discriminating the class, the degree of harmfulness, etc. of a defect on the basis of the extracted feature values. These functions will now be described briefly.

Defect Part Identification Function

The detection processing section 229 performs, on each pixel of the acquired depth image and luminance image, filter processing of obtaining the linear sum of the pixel values of that pixel and surrounding pixels (a value showing the depth or the luminance value) and thereby emphasizes a region of a longitudinal line-shaped flaw, a transverse line-shaped flaw, a minute flaw, etc., and determines whether the obtained value is more than or equal to a second threshold for identifying a defect part or not. By performing such filter processing and determination processing based on the result of the filter processing, the detection processing section 229 can generate a binarized image for identifying a defect part. In the binarized image, a pixel in which the calculated value is less than the second threshold falls under a normal place (that is, the pixel value of the binarized image=0), and a pixel in which the calculated value is more than or equal to the second threshold falls under a defect place (that is, the pixel value of the binarized image=1). Further, the detection processing section 229 combines defect places continuously appearing one after another, and thereby identifies an individual defect part.

Feature Value Extraction Function

On identifying defect parts of the depth image and the luminance image by means of the defect part identification function, the detection processing section 229 extracts feature values regarding the form and the pixel values of the defect part for each identified defect part. Examples of the feature value regarding the form of the defect part include the width of the defect part, the length of the defect part, the perimeter of the defect part, the area of the defect part, the area of a circumscribed rectangle of the defect part, etc. As the feature value regarding the pixel values of the defect part, the maximum value, the minimum value, the average value, etc. of the depths of the defect part may be given for the depth image, and the maximum value, the minimum value, the average value, etc. of the luminances of the defect part may be given for the luminance image.

Defect Discrimination Function

On extracting feature values of each defect part by means of the feature value extraction function, the detection processing section 229 discriminates, for each defect part, the class, the degree of harmfulness, etc. of the defect on the basis the extracted feature values. The processing of discriminating the class, the degree of harmfulness, etc. of the defect based on the feature values is performed by, for example, using a logic table like that shown in FIG. 15. That is, the detection processing section 229 discriminates the class and the degree of harmfulness of the defect on the basis of discrimination conditions expressed by a logic table like that illustrated in FIG. 15.

As illustrated in FIG. 15, the class of a defect (defect A1 to defect An) is described as an item in the vertical direction of the logic table, and the type of a feature value (feature value B1 to feature value Bm) is described as an item in the horizontal direction of the logic table. In each cell of a table prescribed by the classes of defects and feature values, a discrimination condition formula (condition formula C11 to condition formula Cnm) based on the magnitude of the corresponding feature value is described. Each row of such a logic table forms a set, and serves as conditions for discriminating the class of an individual defect. The discrimination processing is sequentially performed from the class described in the uppermost row, and finishes at the time point when all the discrimination conditions described in any one row are satisfied.

Such a logic table can be created by a known method using a database constructed by learning processing using, as teaching data, past operation data and the results of identification of the classes and the degrees of harmfulness of defects obtained by an examiner based on those operation data.

The detection processing section 229 identifies the class and the degree of harmfulness of the defect for each defect part thus detected, and outputs the obtained detection results to the display control section 205. Thereby, information regarding defects existing on the inner surface of the tubular body that is the object to be detected is outputted to a display section (not illustrated). Further, the detection processing section 229 may output the obtained detection results to an external device such as a process computer system for production management, or may use the obtained detection results to create record files of defects of products. Further, the detection processing section 229 may associate information regarding the results of detection of defect parts with time information regarding the date and time at which the information is calculated and regarding other matters, and may store these pieces of information as history information in the storage section 207 or the like.

Although in the above description a case where the class and the degree of harmfulness of a defect are discriminated using a logic table is described, the method for discriminating the class and the degree of harmfulness of a defect is not limited to the above example. For example, a discriminator such as a neural network or a support vector machine (SVM) may be created by learning processing using, as teaching data, past operation data and the results of identification of the classes and the degrees of harmfulness of defects obtained by an examiner based on those operation data, and the discriminator may be used for the discrimination of the class and the degree of harmfulness of a defect.

Hereinabove, the configuration of the image processing section 203 included in the arithmetic processing apparatus 200 according to the present embodiment is described in detail.

In the above description, a case where, when calculating a depth image, the depth image calculation section 225 performs approximate correction processing such as difference arithmetic processing or low-pass filter processing is described. However, this approximate correction processing may also be performed by the light-section line processing section 223 before the light-section line processing section 223 calculates light-section line feature values.

Hereinabove, examples of the function of the arithmetic processing apparatus 200 according to the present embodiment are described. The constituent elements mentioned above may be constructed using general-purpose members and circuits, or may be constructed with a hardware component specializing in the function of each constituent element. Further, all the functions of the constituent elements may be performed by a CPU or the like. Thus, the configuration used may be changed in accordance with the technical level on each occasion when the present embodiment is implemented, as appropriate.

A computer program for implementing each function of an arithmetic processing apparatus according to the present embodiment like that described above may be created, and may be installed into a personal computer or the like. Also a computer-readable recording medium in which such a computer program is stored may be provided. The recording medium is, for example, a magnetic disk, an optical disk, a magneto-optical disk, a flash memory, or the like. The computer program mentioned above may also be distributed via a network, without using a recording medium, for example.

<With Regard to Modification Examples of Tubular Body Imaging Apparatus 100>

Figure 16:
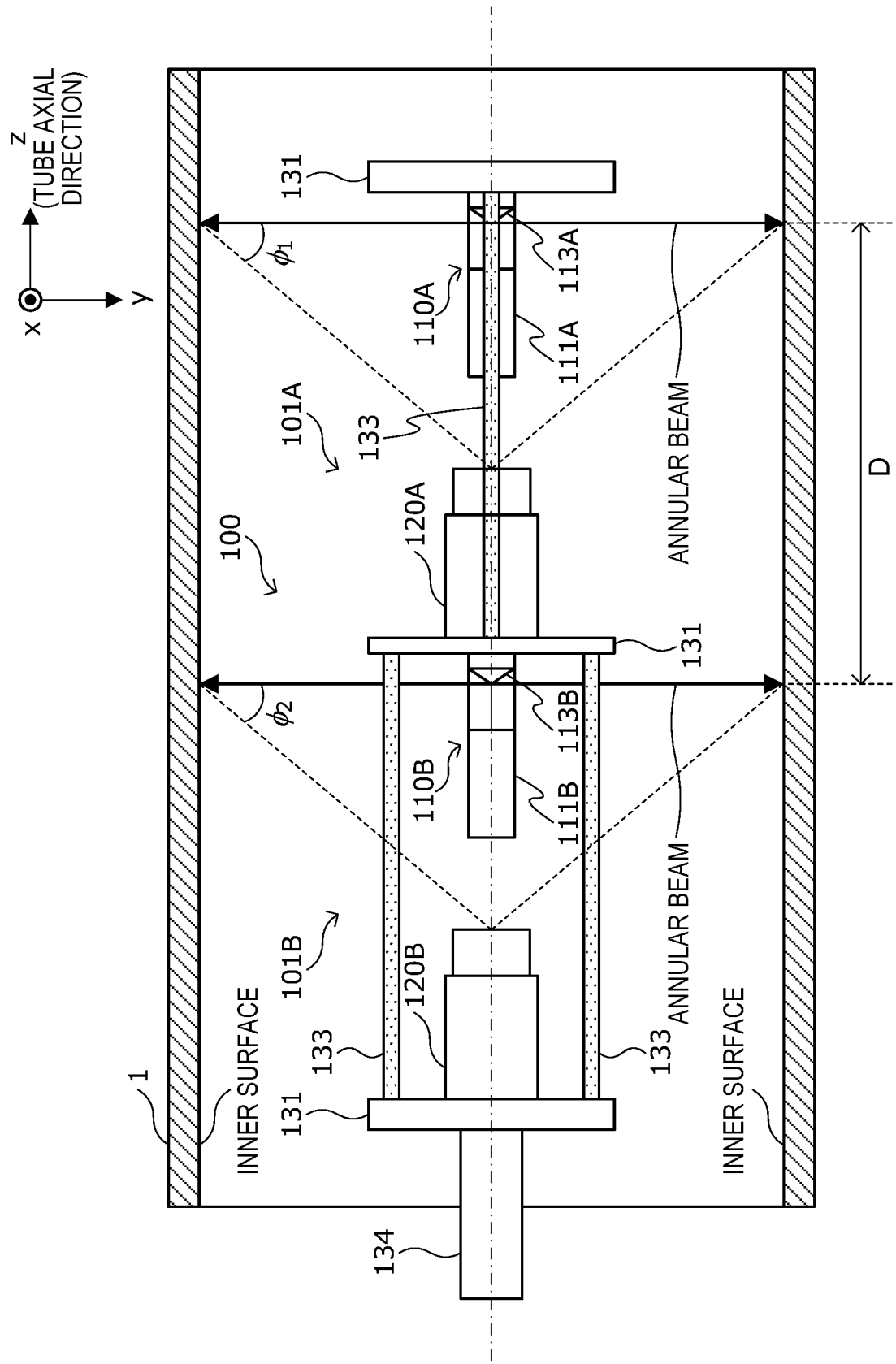
FIG. 16 is an explanatory diagram schematically showing another configuration example of the tubular body imaging apparatus according to the embodiment.
Figure 17:
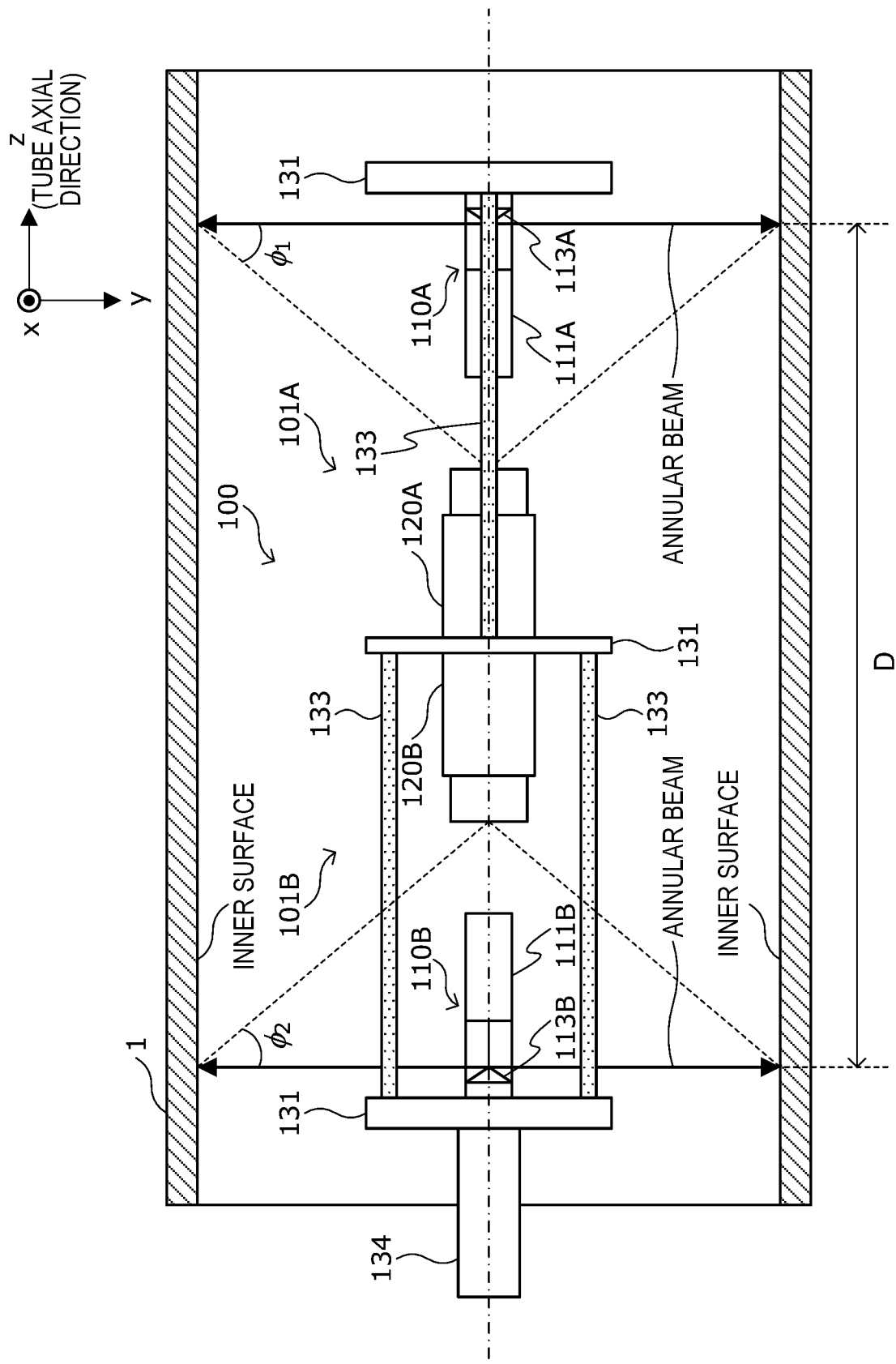
FIG. 17 is an explanatory diagram schematically showing another configuration example of the tubular body imaging apparatus according to the embodiment.

Here, modification examples of the tubular body imaging apparatus 100 according to the present embodiment are briefly described with reference to FIG. 16 and FIG. 17. FIG. 16 and FIG. 17 are explanatory diagrams schematically showing modification examples of the tubular body imaging apparatus 100 according to the present embodiment.

In the configuration of the tubular body imaging apparatus 100 shown in FIG. 2, the two imaging units 101A and 101B are linked together such that the area camera 120B, the laser light source 111B, the optical element 113B, the optical element 113A, the laser light source 111A, and the area camera 120A are aligned in this order along the tube axial direction of the tubular body 1.

However, the method for linking the imaging units 101A and 101B together in the tubular body imaging apparatus 100 according to the present embodiment is not limited to the example shown in FIG. 2; for example, as shown in FIG. 16, the two imaging units 101A and 101B may be linked together such that the area camera 120B, the laser light source 111B, the optical element 113B, the area camera 120A, the laser light source 111A, and the optical element 113A are aligned in this order along the tube axial direction of the tubular body 1.

Further, the method for linking the imaging units 101A and 101B together in the tubular body imaging apparatus 100 according to the present embodiment may be, for example as shown in FIG. 17, a method in which the two imaging units 101A and 101B are linked together such that the optical element 113B, the laser light source 111B, the area camera 120B, the area camera 120A, the laser light source 111A, and the optical element 113A are aligned in this order along the tube axial direction of the tubular body 1.

At this time, as is clear when attention is focused on the amount of displacement d between the irradiation positions of the two annular beams in FIG. 2, FIG. 16, and FIG. 17, it can be seen that the amount of displacement (offset) D between the irradiation positions is smallest in the linking method shown in FIG. 2, and is largest in the linking method shown in FIG. 17. Hence, by employing the linking method shown in FIG. 2, the amount of movement in the tube axial direction of the tubular body imaging apparatus 100 can be minimized and inspection processing can be performed in a simpler way in actual inspection processing of the inner surface of a tubular body.

Hereinabove, modification examples of the tubular body imaging apparatus 100 according to the present embodiment are briefly described.

<With Regard to Tubular Body Inner Surface Inspection Method>

Figure 18:
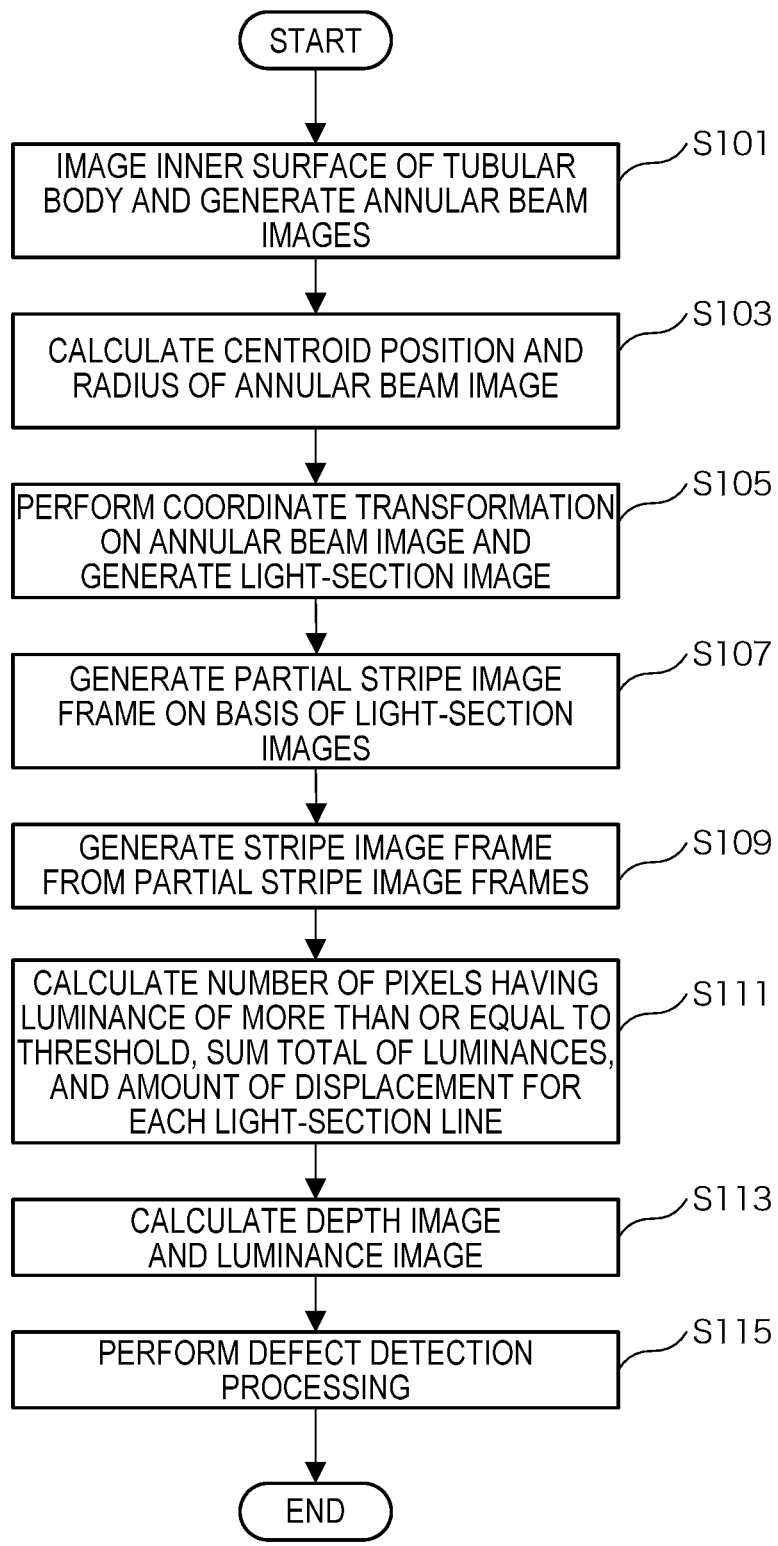
FIG. 18 is a flow chart showing an example of a sequence of a tubular body inner surface inspection method according to the embodiment.

Next, a sequence of a tubular body inner surface inspection method according to the present embodiment is briefly described with reference to FIG. 18. FIG. 18 is a flow chart showing an example of a sequence of a tubular body inner surface inspection method according to the present embodiment.

First, the tubular body imaging apparatus 100 of the tubular body inner surface inspection apparatus 10 uses an annular beam to image the inner surface of a tubular body that is an object to be processed, and outputs captured images obtained by each of the area cameras 120A and 120B to the arithmetic processing apparatus 200. Here, two imaging object regions (ROI) like those mentioned above are set in the area cameras 120A and 120B in advance. The A/D conversion section 211 of the image processing section 203 included in the arithmetic processing apparatus 200 performs A/D conversion processing on the acquired captured images sent from the two area cameras 120, and generates annular beam images (step S101).

Next, the annular beam center calculation section 213 calculates the centroid position and the radius of an annular beam image using annular beam images that are captured by the two area cameras 120A and 120B and generated by the A/D conversion section 211 (step S103), and outputs the obtained calculation results to the coordinate transformation section 215.

Subsequently, the coordinate transformation section 215 performs a coordinate transformation on the annular beam images captured by the two area cameras 120A and 120B, using the calculated centroid position, radius, etc., and generates light-section images (step S105). The generated light-section images are sequentially stored in the image memory provided in the storage section 207 or the like, along the tube axial direction of the tubular body.

After that, the partial stripe image frame generation section 217 sequentially arranges the generated light-section images along the tube axial direction of the tubular body, and generates partial stripe image frames (step S107). The partial stripe image frame generation section 217 outputs the generated partial stripe image frames to the stripe image frame generation section 219. The stripe image frame generation section 219 generates a stripe image frame using partial stripe image frames generated by the partial stripe image frame generation section 217 (step S109). The stripe image frame generation section 219 outputs the generated stripe image frames to the light-section line processing section 223.

Using each generated stripe image frame, the light-section line processing section 223 calculates, for each light-section line, the number of pixels having a luminance of more than or equal to a prescribed threshold Th, the sum total of the luminances of those pixels, and the amount of displacement of the light-section line (step S111). These calculation results are used as light-section line feature values. The calculated light-section line feature values are outputted to each of the depth image calculation section 225 and the luminance image calculation section 227.

The depth image calculation section 225 calculates a depth image using a calculated light-section line feature value (in particular, the feature value regarding the amount of displacement of the light-section line) (step S113). Further, the luminance image calculation section 227 calculates a luminance image using calculated light-section line feature values (in particular, the feature value regarding the number of pixels having a luminance of more than or equal to a threshold and the feature value regarding the sum total of luminances) (step S113). The depth image calculation section 225 and the luminance image calculation section 227 output the respective calculated images to the detection processing section 229.

The detection processing section 229 detects defect parts existing on the inner surface of the tubular body using each of the calculated depth images and each of the calculated luminance images, and identifies the class and the degree of harmfulness of a defect of each of the detected defect parts (step S115). By a sequence like the above, defects existing on the inner surface of the tubular body are detected.

Hereinabove, a tubular body inner surface inspection apparatus and a tubular body inner surface inspection method according to the present embodiment are described in detail.

Second Embodiment

In the first embodiment mentioned above, a case where two imaging units 101 each including the illumination mechanism 110, the area camera 120, the holding substrates 131 to which the illumination mechanism 110 and the area camera 120 are individually fixed, and the linking members 133 each of which is a support column linking the two holding substrates 131 are linked together in the tube axial direction of the tubular body 1 is described in detail. Here, the number of imaging units 101 linked in the tube axial direction is not limited to two, which is shown in the first embodiment, and three or more imaging units 101 may be linked in the tube axial direction.

Figure 19:
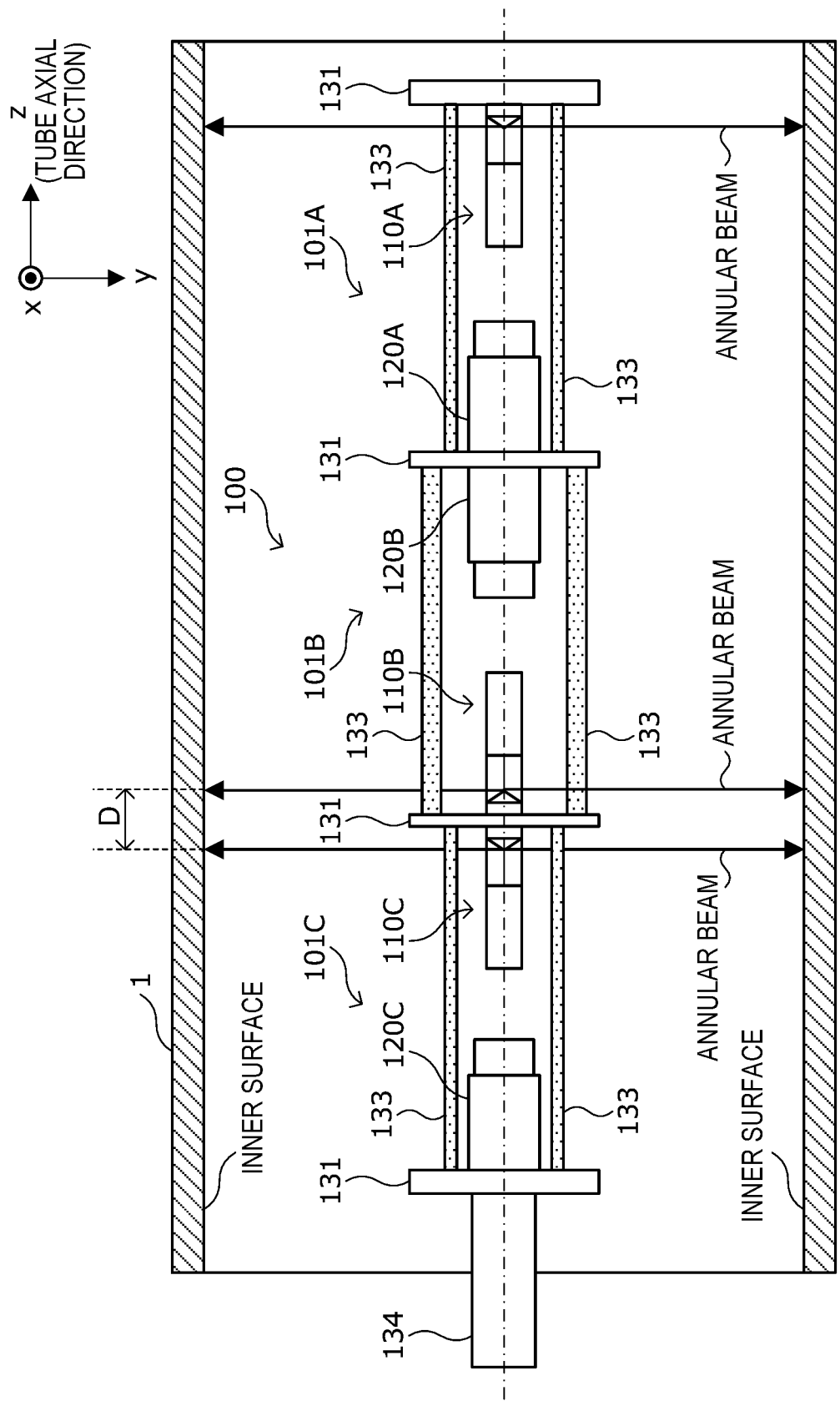
FIG. 19 is an explanatory diagram schematically showing an example of a configuration of a tubular body imaging apparatus according to a second embodiment of the present invention.
Figure 20:
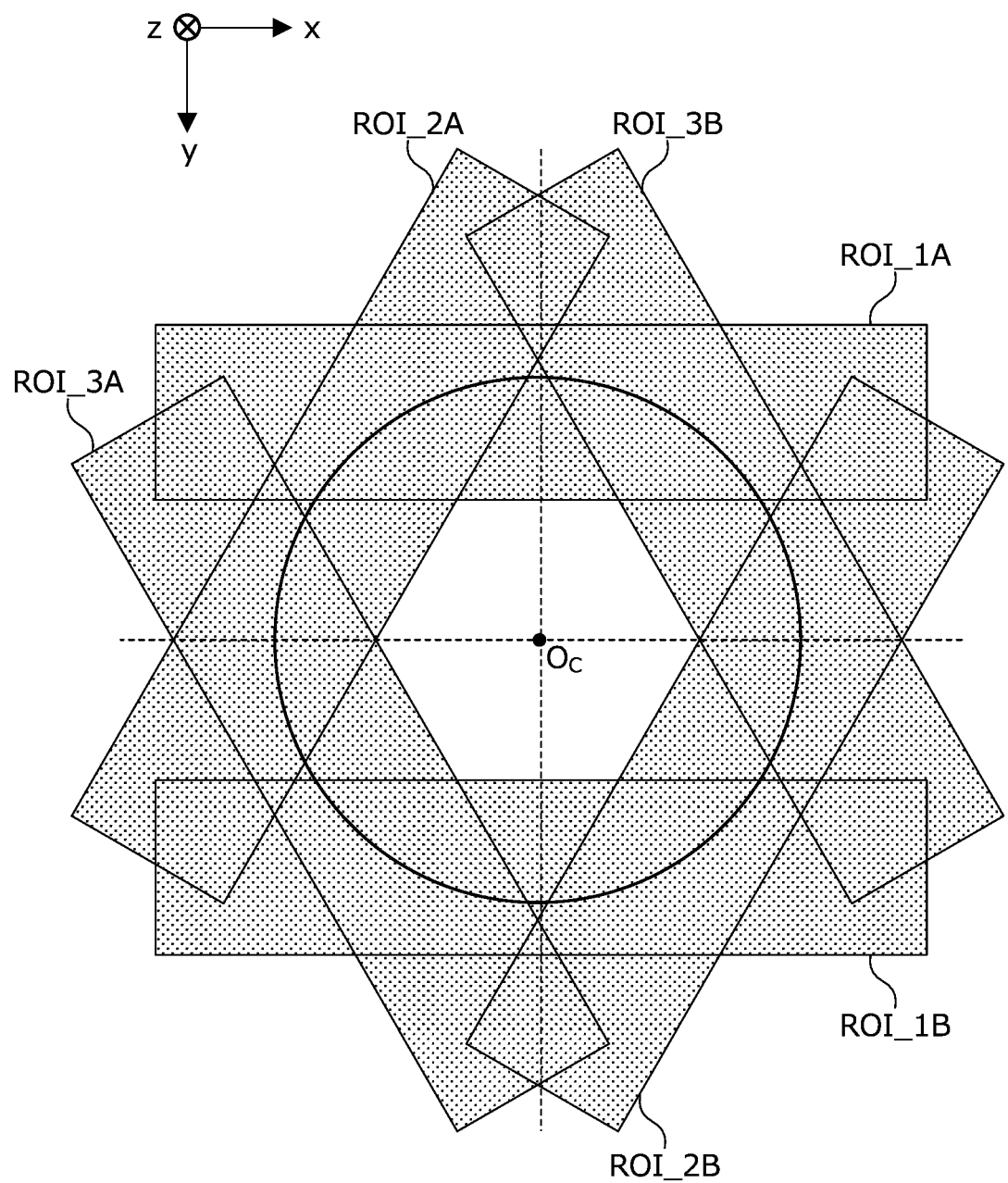
FIG. 20 is an explanatory diagram for describing the tubular body imaging apparatus according to the embodiment.

FIG. 19 is an explanatory diagram schematically showing an example of the configuration of a tubular body imaging apparatus according to a second embodiment of the present invention, and FIG. 20 is an explanatory diagram for describing the tubular body imaging apparatus according to the present embodiment.

FIG. 19 schematically shows a tubular body imaging apparatus 100 in which three imaging units 101A, 101B, and 101C are linked in the tube axial direction. Also in this case, the three imaging units 101A, 101B, and 101C or more imaging units are linked in series such that the position of the linking member 133 in a plane orthogonal to the tube axis is different between imaging units. Hence, the regions of the visual fields of the area camera 120A, the area camera 120B, and the area camera 120C that are blocked by the linking member 133, the linking member 133, and the linking member 133, respectively, are different in a plane orthogonal to the tube axis. Therefore, if the inner surface of the tubular body 1 is scanned and imaged by all of the area camera 120A, the area camera 120B, and the area camera 120C, the entire inner surface can be imaged without a loss of the visual field.

Also in the present embodiment, two kinds of imaging object regions (ROI) are set for each of the area cameras 120. In the case where N (N≥3) imaging units 101 exist in the tubular body imaging apparatus 100, two kinds of imaging object regions (ROI) are set for the area camera 120 provided in each imaging unit 101; thus, 2×N kinds of imaging object regions (ROI) are set for the N imaging units 101 in total. It is sufficient that the entire circumference of the annular beam applied toward the inner surface of the tubular body (in other words, a circular arc equivalent to 360°) be imaged in 2×N kinds of imaging object regions (ROI). Hence, it is sufficient that one imaging object region (ROI) in one area camera 120 include an annular beam equivalent to at least (180/N°) in this region. From this, in the case where N (N≥3) imaging units 101 are linked in series, if the imaging units 101 are linked while being rotated around the tube axial direction at intervals of (180/N°), waste is avoided in arithmetic processing in a later stage; thus, this is efficient and favorable.

FIG. 20 schematically shows a distribution of six imaging object regions (ROI) in the case where three imaging units 101A, 101B, and 101C are linked while being rotated at intervals of (180/3) (=60°) around the tube axial direction. As is clear from FIG. 20, it can be seen that, by arranging three imaging units while rotating them at intervals of 60° around the tube axial direction, the entire circumference of the annular beam can be imaged without causing an unimaged region.

Further, also when the number of imaging units 101 is four or more, the imaging units 101 may be linked in a similar way to the above.

The handling of the annular beam image captured by the area camera 120 in each imaging unit 101 is similar to that of the first embodiment, and a detailed description is omitted. Also in this case, the centroid position and the radius of the annular beam are calculated using a plurality of annular beam images obtained, similarly to the handling of annular beam images in the case where N=2. After that, light-section images may be generated by performing a coordinate transformation of the obtained plurality of annular beam images on the basis of the obtained centroid position and radius, and a stripe image frame may be generated from the generated light-section images. The processing on the obtained stripe image frame is similar to that of the first embodiment, and a detailed description is omitted in the following.

Hereinabove, the tubular body inner surface inspection apparatus according to the second embodiment of the present invention is briefly described.

(Hardware Configuration)

Figure 21:
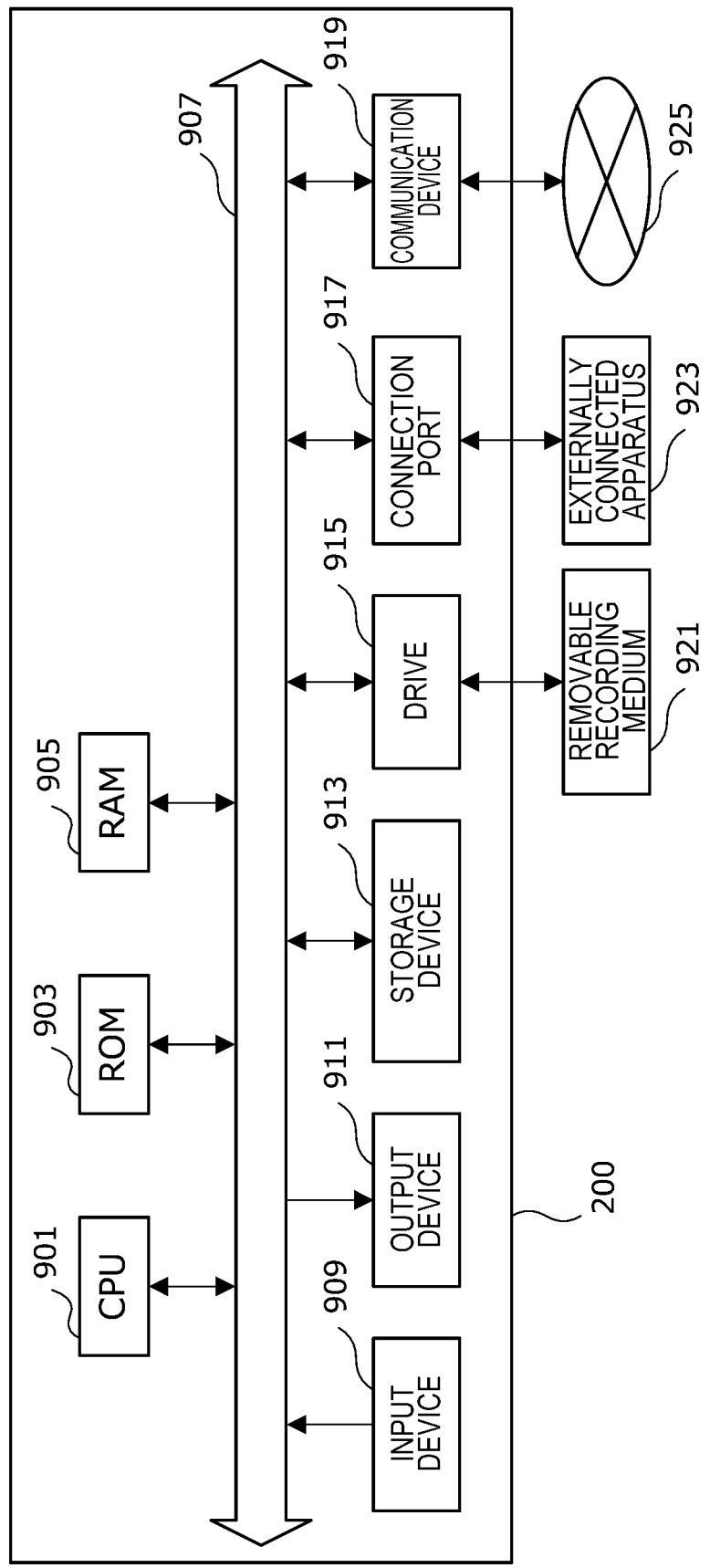
FIG. 21 is a block diagram schematically showing an example of a hardware configuration of an arithmetic processing apparatus according to each embodiment of the present invention.

The hardware configuration of the arithmetic processing apparatus 200 according to each embodiment of the present invention will be described in detail in FIG. 21. FIG. 21 is a block diagram for describing the hardware configuration of the arithmetic processing apparatus 200 according to each embodiment of the present invention.

The arithmetic processing apparatus 200 mainly includes a CPU 901, a ROM 903, and a RAM 905. Furthermore, the arithmetic processing apparatus 200 also includes a bus 907, an input device 909, an output device 911, a storage device 913, a drive 915, a connection port 917, and a communication device 919.

The CPU 901 serves as a main arithmetic processing apparatus and a control device, and controls the overall operation or a part of the operation of the arithmetic processing apparatus 200 according to various programs recorded in the ROM 903, the RAM 905, the storage device 913, or a removable recording medium 921. The ROM 903 stores programs, operation parameters, and the like used by the CPU 901. The RAM 905 primarily stores programs that the CPU 901 uses and parameters and the like varying as appropriate during the execution of the programs. These are connected with each other via the bus 907 configured from an internal bus such as a CPU bus or the like.

The bus 907 is connected to the external bus such as a PCI (Peripheral Component Interconnect/Interface) bus via the bridge.

The input device 909 is an operation means operated by a user, such as a mouse, a keyboard, a touch panel, buttons, a switch and a lever. The input device 909 may be a remote control means (a so-called remote control) using, for example, infrared light or other radio waves, or may be an externally connected apparatus 923 such as a PDA conforming to the operation of the arithmetic processing apparatus 200. Furthermore, the input device 909 generates an input signal based on, for example, information which is input by a user with the above operation means, and is configured from an input control circuit for outputting the input signal to the CPU 901. The user of the arithmetic processing apparatus 200 can input various data to the arithmetic processing apparatus 200 and can instruct the arithmetic processing apparatus 200 to perform processing by operating this input device 909.

The output device 911 is configured from a device capable of visually or audibly notifying acquired information to a user. Examples of such device include display devices such as a CRT display device, a liquid crystal display device, a plasma display device, an EL display device and lamps, audio output devices such as a speaker and a headphone, a printer, a mobile phone, a facsimile machine, and the like. For example, the output device 911 outputs a result obtained by various processes performed by the arithmetic processing apparatus 200. More specifically, the display device displays, in the form of texts or images, a result obtained by various processes performed by the arithmetic processing apparatus 200. On the other hand, the audio output device converts an audio signal such as reproduced audio data and sound data into an analog signal, and outputs the analog signal.

The storage device 913 is a device for storing data configured as an example of a storage unit of the arithmetic processing apparatus 200 and is used to store data. The storage device 913 is configured from, for example, a magnetic storage device such as an HDD (Hard Disk Drive), a semiconductor storage device, an optical storage device, or a magneto-optical storage device. This storage device 913 stores programs to be executed by the CPU 901, various data, and various data obtained from the outside.

The drive 915 is a reader/writer for recording medium, and is embedded in the arithmetic processing apparatus 200 or attached externally thereto. The drive 915 reads information recorded in the attached removable recording medium 921 such as a magnetic disk, an optical disk, a magneto-optical disk, or a semiconductor memory, and outputs the read information to the RAM 905. Furthermore, the drive 915 can write in the attached removable recording medium 921 such as a magnetic disk, an optical disk, a magneto-optical disk, or a semiconductor memory. The removable recording medium 921 is, for example, a CD medium, a DVD medium, or a Blu-ray (registered trademark) medium. The removable recording medium 921 may be a Compact-Flash (CF; registered trademark), a flash memory, an SD memory card (Secure Digital Memory Card), or the like. Alternatively, the removable recording medium 921 may be, for example, an IC card (Integrated Circuit Card) equipped with a non-contact IC chip or an electronic device.

The connection port 917 is a port for allowing devices to directly connect to the arithmetic processing apparatus 200. Examples of the connection port 917 include a USB (Universal Serial Bus) port, an IEEE1394 port, a SCSI (Small Computer System Interface) port, an RS-232C port, an HDMI (high-definition multimedia interface) port, and the like. By the externally connected apparatus 923 connecting to this connection port 917, the arithmetic processing apparatus 200 directly obtains various data from the externally connected apparatus 923 and provides various data to the externally connected apparatus 923.

The communication device 919 is a communication interface configured from, for example, a communication device for connecting to a communication network 925. The communication device 919 is, for example, a wired or wireless LAN (Local Area Network), Bluetooth (registered trademark), a communication card for WUSB (Wireless USB), or the like. Alternatively, the communication device 919 may be a router for optical communication, a router for ADSL (Asymmetric Digital Subscriber Line), a modem for various communications, or the like. This communication device 919 can transmit and receive signals and the like in accordance with a predetermined protocol such as TCP/IP on the Internet and with other communication devices, for example. The communication network 925 connected to the communication device 919 is configured from a network and the like, which is connected via wire or wirelessly, and may be, for example, the Internet, a home LAN, a corporate LAN, infrared communication, radio wave communication, satellite communication, or the like.

Heretofore, an example of the hardware configuration capable of realizing the functions of the arithmetic processing apparatus 200 according to each embodiment of the present invention has been shown. Each of the structural elements described above may be configured using a general-purpose material, or may be configured from hardware dedicated to the function of each structural element. Accordingly, the hardware configuration to be used can be changed as appropriate according to the technical level at the time of carrying out the present embodiment.

CONCLUSIONS

As described hereinabove, by using the tubular body inner surface inspection apparatus 10 according to each embodiment of the present invention, the inner surface of a tubular body can be inspected at higher speed, with higher resolving power, and in a simpler way throughout the entire circumference in the tube circumferential direction and the entire length in the tube axial direction, and minute unevenness-shaped defects and figure-like defects can be detected simultaneously with high accuracy. Furthermore, by the tubular body inner surface inspection apparatus 10 according to each present embodiment of the present invention, the position where a defect has occurred can be identified accurately; thus, the tubular body inner surface inspection apparatus 10 according to the present embodiment can greatly contribute to improvements in productivity and yield, and quality assurance of a tubular body such as a steel tube.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

REFERENCE SIGNS LIST 10 tubular body inner surface inspection apparatus
100 tubular body imaging apparatus
110 illumination mechanism
111 laser light source
113 optical element
120 area camera
131 holding substrate
133 linking members
200 arithmetic processing apparatus
201 imaging control section
203 image processing section
205 display control section
207 storage section
211 A/D conversion section
213 annular beam center calculation section
215 coordinate transformation section
217 partial stripe image frame generation section
219 stripe image frame generation section
221 image calculation section
223 light-section line processing section
225 depth image calculation section
227 luminance image calculation section
229 detection processing section

What is claimed is:

1. A tubular body inner surface inspection apparatus that detects a defect existing on an inner surface of a tubular body,
the apparatus comprising:
a tubular body imaging apparatus including
N (N≥2) imaging units each including
a laser light source that applies laser light,
an optical element that reflects laser light applied from the laser light source in a circumferential direction of the inner surface of the tubular body, as annular laser light,
an area camera that images a region of the inner surface of the tubular body where the annular laser light is applied, and thereby generates an annular beam image, and
a linking member that links together and fixes the laser light source and the area camera,
in which the imaging units are linked in series along a tube axial direction of the tubular body in such a manner that positions of the linking members in a plane orthogonal to a tube axis are different from each other;
a movement apparatus that moves the tubular body imaging apparatus along the tube axial direction of the tubular body; and
an arithmetic processing apparatus that, while moving the tubular body imaging apparatus by means of the movement apparatus, performs image processing on a plurality of annular beam images generated in each of the imaging units and assesses whether a defect exists on the inner surface of the tubular body or not.

2. The tubular body inner surface inspection apparatus according to claim 1,
wherein the area camera in each of the imaging units generates a plurality of annular beam images by imaging portions corresponding to regions of an entire visual field of the area camera where the annular laser light is not blocked by the linking member and furthermore corresponding to end regions of the entire visual field of the area camera, which end regions are set individually in end portions in a direction orthogonal to a pixel information transfer direction that is a direction in which pixel information that is information regarding a charge or a voltage of each pixel of an imaging element included in the area camera is transferred in the imaging element.

3. The tubular body inner surface inspection apparatus according to claim 2,
wherein the arithmetic processing apparatus
uses an annular beam image obtained from each of the imaging units to calculate a centroid position and a radius of an irradiation portion of the annular laser light,
performs a polar coordinate transformation on a coordinate system of annular beam images obtained from each of the imaging units, on the basis of the calculated centroid position and an amount of separation between the centroid position and the irradiation portion of the annular laser light, and generates, for each of the imaging units, light-section images each including a light-section line that is a line segment obtained by the polar coordinate transformation and corresponding to the irradiation portion of the annular laser light,
generates partial stripe image frames in each of which obtained light-section images of each of the imaging units are sequentially arranged along the tube axial direction,
adjusts the partial stripe image frames on the basis of a positional relationship between the N imaging units, connects the partial stripe image frames in planes orthogonal to the tube axis, and generates a stripe image frame,
calculates a depth image showing unevenness condition of the inner surface of the tubular body and a luminance image showing luminance distribution of the annular laser light on the inner surface of the tubular body, on the basis of the stripe image frame, and
detects a defect existing on the inner surface of the tubular body on the basis of the depth image and the luminance image.

4. The tubular body inner surface inspection apparatus according to claim 2,
wherein the arithmetic processing apparatus
uses an annular beam image obtained from each of the imaging units to calculate a centroid position and a radius of an irradiation portion of the annular laser light,
performs a polar coordinate transformation on a coordinate system of annular beam images obtained from each of the imaging units, on the basis of the calculated centroid position and an amount of separation between the centroid position and the irradiation portion of the annular laser light, and generates, for each of the imaging units, light-section images each including a light-section line that is a line segment obtained by the polar coordinate transformation and corresponding to the irradiation portion of the annular laser light,
adjusts the obtained light-section images of the imaging units on the basis of a positional relationship between the N imaging units, connects the light-section images in planes orthogonal to the tube axis, and thereby generates a stripe image frame in which the connected light-section images are sequentially arranged along the tube axial direction,
calculates a depth image showing unevenness condition of the inner surface of the tubular body and a luminance image showing luminance distribution of the annular laser light on the inner surface of the tubular body, on the basis of the stripe image frame, and
detects a defect existing on the inner surface of the tubular body on the basis of the depth image and the luminance image.

5. The tubular body inner surface inspection apparatus according to claim 1,
wherein a region mutually overlapping in a partial way exists between annular beam images of imaging units.

6. The tubular body inner surface inspection apparatus according to claim 1,
wherein wavelengths of beams of laser light applied from the laser light sources in imaging units are different from each other, and
in a prior stage of the area camera in each of the imaging units, a wavelength selection filter that transmits light of the same wavelength as the wavelength of the beam of laser light of the laser light source included in the same imaging unit as the area camera is provided.

7. The tubular body inner surface inspection apparatus according to claim 1,
wherein the N imaging units are linked such that the area camera, the laser light source, and the optical element are aligned in an alignment order of (an area camera, a laser light source, an optical element), (an optical element, a laser light source, an area camera), etc. between the plurality of imaging units.

8. The tubular body inner surface inspection apparatus according to claim 1,
wherein the N imaging units are linked such that the optical element, the laser light source, and the area camera are aligned in an alignment order of (an optical element, a laser light source, an area camera), (an area camera, a laser light source, an optical element), etc. between the plurality of imaging units.

9. The tubular body inner surface inspection apparatus according to claim 1,
wherein the N imaging units are linked such that the area camera, the laser light source, and the optical element repeat an alignment order of (an area camera, a laser light source, an optical element) between the plurality of imaging units.

10. A tubular body inner surface inspection method for detecting a defect existing on an inner surface of a tubular body,
the method using a tubular body inner surface inspection apparatus including
a tubular body imaging apparatus including
N (N≥2) imaging units each including
a laser light source that applies laser light,
an optical element that reflects laser light applied from the laser light source in a circumferential direction of the inner surface of the tubular body, as annular laser light,
an area camera that images a region of the inner surface of the tubular body where the annular laser light is applied, and thereby generates an annular beam image, and
a linking member that links together and fixes the laser light source and the area camera,
in which the imaging units are linked in series along a tube axial direction of the tubular body in such a manner that positions of the linking members in a plane orthogonal to a tube axis are different from each other,
a movement apparatus that moves the tubular body imaging apparatus along the tube axial direction of the tubular body, and
an arithmetic processing apparatus that, while moving the tubular body imaging apparatus by means of the movement apparatus, performs image processing on a plurality of annular beam images generated in each of the imaging units and assesses whether a defect exists on the inner surface of the tubular body or not,
the method comprising:
a step of using an annular beam image obtained from each of the imaging units to calculate a centroid position and a radius of an irradiation portion of the annular laser light;
a step of performing a polar coordinate transformation on a coordinate system of annular beam images obtained from each of the imaging units, on the basis of the calculated centroid position and an amount of separation between the centroid position and the irradiation portion of the annular laser light, and generating, for each of the imaging units, light-section images each including a light-section line that is a line segment obtained by the polar coordinate transformation and corresponding to the irradiation portion of the annular laser light;
a step of
generating partial stripe image frames in each of which obtained light-section images of each of the imaging units are sequentially arranged along the tube axial direction, then adjusting the generated partial stripe image frames on the basis of a positional relationship between the N imaging units, connecting the partial stripe image frames in planes orthogonal to the tube axis, and generating a stripe image frame, or
adjusting the obtained light-section images of the imaging units on the basis of the positional relationship between the N imaging units, connecting the light-section images in planes orthogonal to the tube axis, and thereby generating a stripe image frame in which the connected light-section images are sequentially arranged along the tube axial direction;

a step of calculating a depth image showing unevenness condition of the inner surface of the tubular body and a luminance image showing luminance distribution of the annular laser light on the inner surface of the tubular body, on the basis of the stripe image frame; and a step pf detecting a defect existing on the inner surface of the tubular body on the basis of the depth image and the luminance image.

11. The tubular body inner surface inspection method according to claim 10, wherein the area camera in each of the imaging units generates a plurality of annular beam images by imaging portions corresponding to regions of an entire visual field of the area camera where the annular laser light is not blocked by the linking member and furthermore corresponding to end regions of the entire visual field of the area camera, which end regions are set individually in end portions in a direction orthogonal to a pixel information transfer direction that is a direction in which pixel information that is information regarding a charge or a voltage of each pixel of an imaging element included in the area camera is transferred in the imaging element.

12. The tubular body inner surface inspection method according to claim 10, wherein a region mutually overlapping in a partial way exists between annular beam images of imaging units.

13. The tubular body inner surface inspection method according to claim 10, wherein wavelengths of beams of laser light applied from the laser light sources in imaging units are different from each other, and in a prior stage of the area camera in each of the imaging units, a wavelength selection filter that transmits light of the same wavelength as the wavelength of the beam of laser light of the laser light source included in the same imaging unit as the area camera is provided.

14. The tubular body inner surface inspection method according to claim 10, wherein the N imaging units are linked such that the area camera, the laser light source, and the optical element are aligned in an alignment order of (an area camera, a laser light source, an optical element), (an optical element, a laser light source, an area camera), etc. between the plurality of imaging units.

15. The tubular body inner surface inspection method according to claim 10, wherein the N imaging units are linked such that the optical element, the laser light source, and the area camera are aligned in an alignment order of (an optical element, a laser light source, an area camera), (an area camera, a laser light source, an optical element), etc. between the plurality of imaging units.

16. The tubular body inner surface inspection method according to claim 10, wherein the N imaging units are linked such that the area camera, the laser light source, and the optical element repeat an alignment order of (an area camera, a laser light source, an optical element) between the plurality of imaging units.

* * * * *